(12) United States Patent
Kataoka et al.

(10) Patent No.: US 9,764,635 B2
(45) Date of Patent: Sep. 19, 2017

(54) FUEL TANK

(71) Applicant: TOYOTA JIDOSHA KABUSHIKI KAISHA, Toyota-shi (JP)

(72) Inventors: Chiaki Kataoka, Nagakute (JP); Daisuke Tanabe, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/916,797

(22) PCT Filed: Sep. 10, 2014

(86) PCT No.: PCT/IB2014/002015
§ 371 (c)(1),
(2) Date: Mar. 4, 2016

(87) PCT Pub. No.: WO2015/040481
PCT Pub. Date: Mar. 26, 2015

(65) Prior Publication Data
US 2016/0193913 A1 Jul. 7, 2016

(30) Foreign Application Priority Data

Sep. 18, 2013 (JP) .................................. 2013-193434
Jan. 21, 2014 (JP) .................................. 2014-008578

(51) Int. Cl.
*B60K 15/063* (2006.01)
*B60K 15/03* (2006.01)
*B65D 90/02* (2006.01)

(52) U.S. Cl.
CPC ........ *B60K 15/03* (2013.01); *B60K 15/03177* (2013.01); *B60K 2015/0346* (2013.01); *B60K 2015/03453* (2013.01)

(58) Field of Classification Search
CPC .............. B60K 15/03; B60K 15/03177; B60K 2015/03453; B60K 2015/0346
(Continued)

(56) References Cited

U.S. PATENT DOCUMENTS 5,813,566 A * 9/1998 Bradford ................ B65D 19/18
206/298
6,135,306 A * 10/2000 Clayton ........... B60K 15/03177
220/501

(Continued)

FOREIGN PATENT DOCUMENTS

JP 2002-283854 A 10/2002
JP 2002-536586 A 10/2002
(Continued)

OTHER PUBLICATIONS

International Search Report dated Feb. 18, 2015, in PCT/IB2014/002015 Filed Sep. 10, 2014.

*Primary Examiner* — J. Gregory Pickett
*Assistant Examiner* — Niki M Eloshway
(74) *Attorney, Agent, or Firm* — Oblon, McClelland, Maier & Neustadt, L.L.P.

(57) ABSTRACT

A first gap to be eliminated at the time of a compressive deformation of a fuel-tank main body is formed between a lower-side reinforcing member and an upper-side reinforcing member in a fuel-tank main body. A second gap to be eliminated at the time of an expansion deformation of the fuel-tank main body is formed between an opposed member of the lower-side reinforcing member and the upper-side reinforcing member.

13 Claims, 34 Drawing Sheets

(58) Field of Classification Search
USPC .................................... 220/562, 563, 653
See application file for complete search history.

(56) References Cited

U.S. PATENT DOCUMENTS

| | | | | |
|---|---|---|---|---|
| 6,338,420 | B1* | 1/2002 | Pachciarz | ........ B60K 15/03177 |
| | | | | 220/4.13 |
| 6,736,282 | B2* | 5/2004 | Krogull | ................ B60K 15/077 |
| | | | | 220/563 |
| 6,857,534 | B1* | 2/2005 | Keller | .................... B29C 65/20 |
| | | | | 220/4.13 |
| 7,427,000 | B2* | 9/2008 | Austerhoff | ....... B60K 15/03006 |
| | | | | 220/4.14 |
| 2002/0100759 | A1 | 8/2002 | Schmidt et al. | |
| 2009/0206097 | A1* | 8/2009 | Gebert | ............. B60K 15/03177 |
| | | | | 220/653 |
| 2012/0024868 | A1* | 2/2012 | Menke | ................... B60K 15/03 |
| | | | | 220/653 |
| 2012/0037638 | A1* | 2/2012 | Criel | ....................... B29C 49/20 |
| | | | | 220/501 |
| 2012/0138606 | A1* | 6/2012 | Varga | ............... B60K 15/03177 |
| | | | | 220/4.21 |
| 2013/0239931 | A1* | 9/2013 | Kimoto | ................ F02M 25/089 |
| | | | | 123/520 |
| 2014/0305936 | A1* | 10/2014 | Gebert | .................... B29C 66/54 |
| | | | | 220/4.13 |

FOREIGN PATENT DOCUMENTS

| | | |
|---|---|---|
| JP | 2007-106317 A | 4/2007 |
| JP | 2012-035914 A | 2/2012 |

* cited by examiner

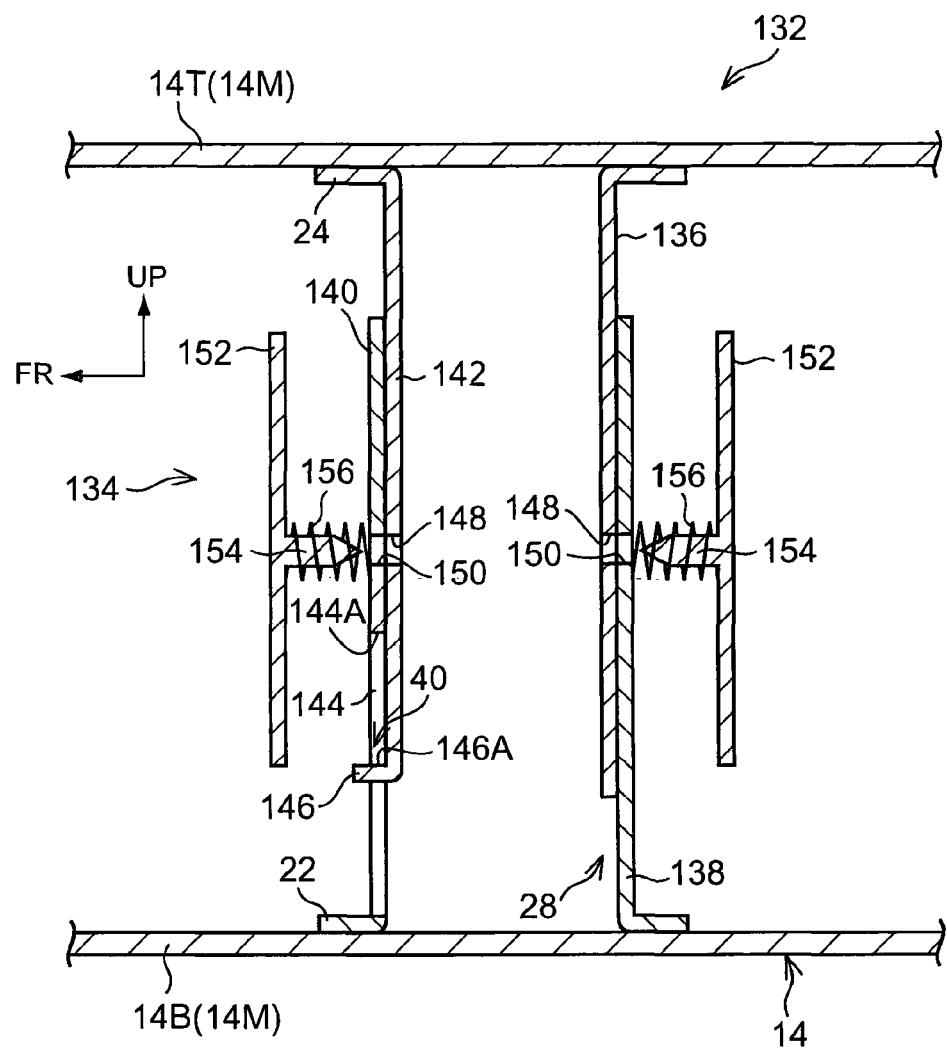

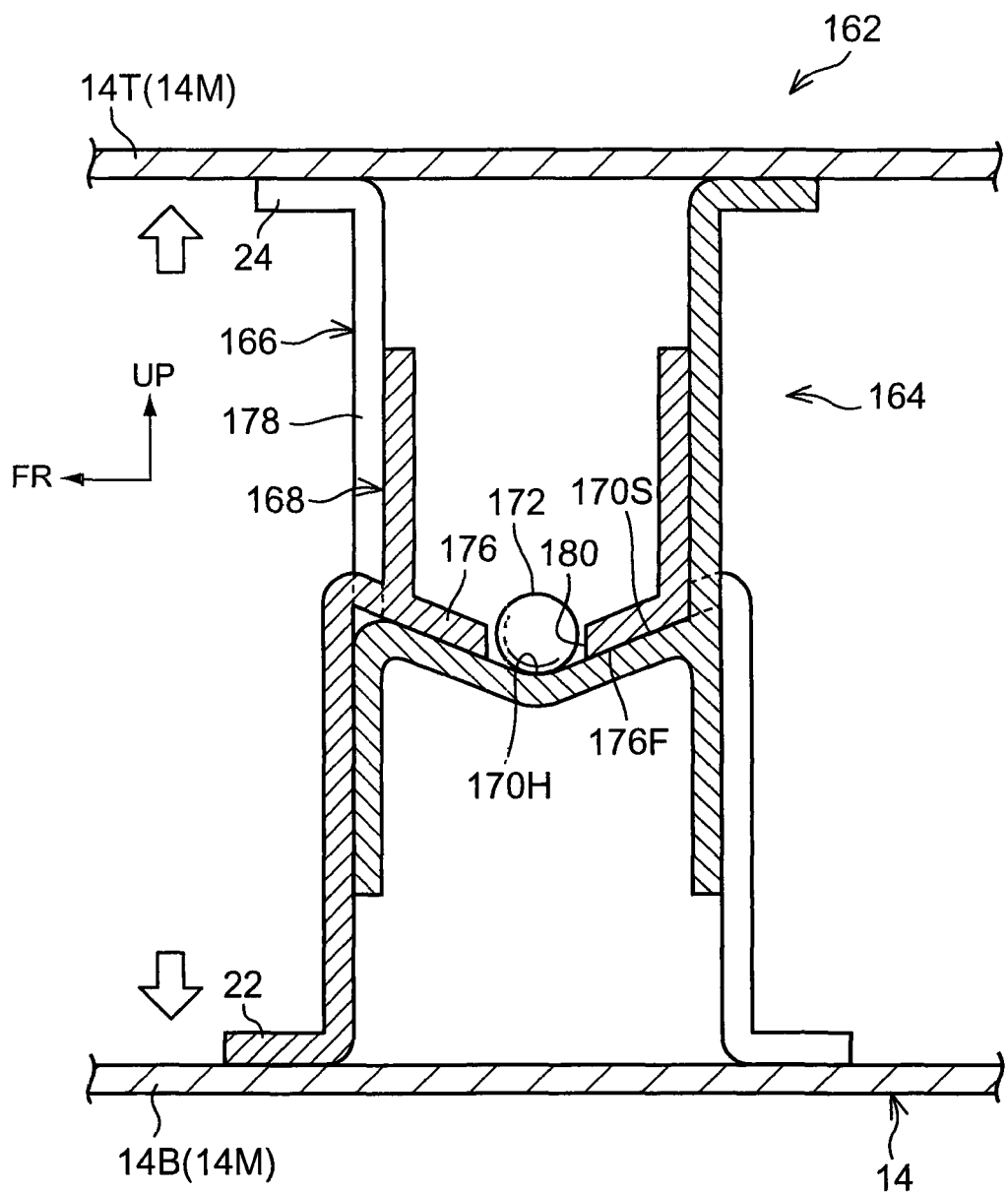

FIG. 17
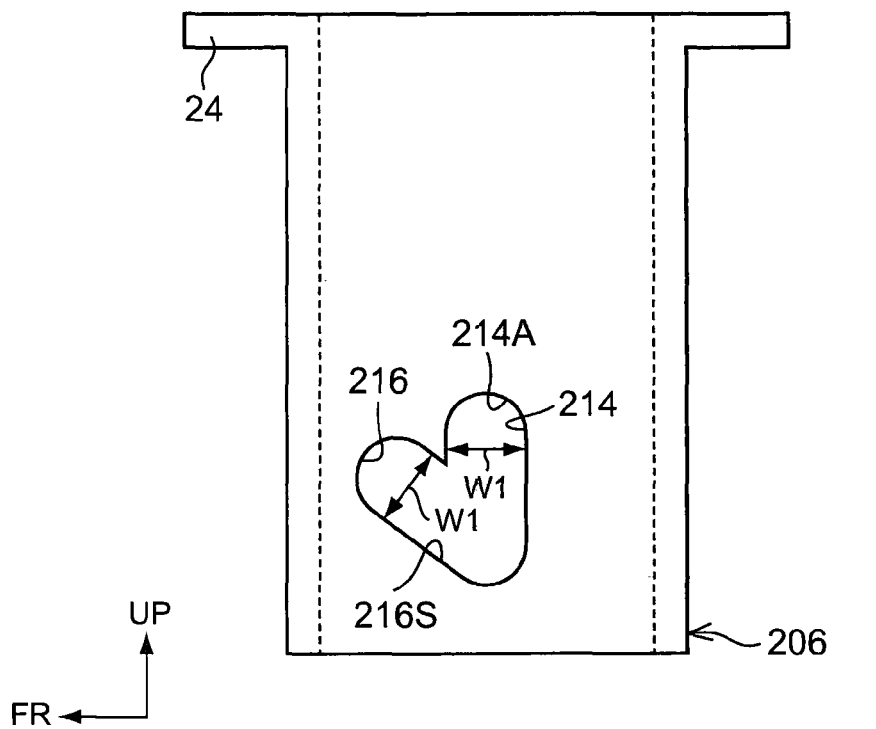
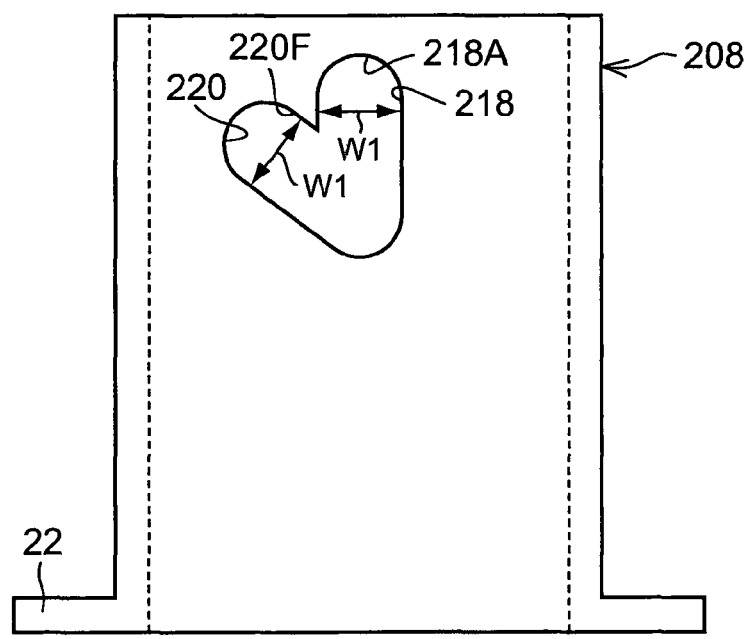

FUEL TANK

BACKGROUND OF THE INVENTION

1. Field of the Invention

The present invention relates to a fuel tank.

2. Description of Related Art

As a fuel tank provided in an automobile, there is such a structure in which a reinforcement device is provided between a top face and a bottom face of a tank so as to absorb both a compression force and a tensile force, as described in Japanese Patent Application Publication No. 2012-35914 (JP 2012-35914 A).

However, the structure described in JP 2012-35914 A is configured such that wall portions are prevented from moving away from each other by axially fastening means when a pressure in a fuel tank 1 is increased. This results in that the structure cannot tolerate deformation (volume change) of the fuel tank. Further, when an internal pressure of the fuel tank is decreased, a spring device is compressed, so that it is difficult to keep a given deformation amount of the fuel tank.

SUMMARY OF THE INVENTION

The present invention provides a fuel tank that keeps given deformation amounts of a compressive deformation and an expansion deformation of a fuel-tank main body.

A fuel tank of a first aspect of the present invention includes: a fuel-tank main body in which to store fuel; and a structural member provided between two opposing walls of the fuel-tank main body, the structural member including a first contacting member configured to eliminate a first gap so as to achieve contact when the opposing walls come close to each other, the structural member including a second contacting member configured to eliminate a second gap so as to achieve contact when the opposing walls separate from each other.

In the fuel tank, the structural member is provided between two opposing walls of the fuel-tank main body.

When the opposing walls come close to each other at the time when the fuel-tank main body is compressed (e.g., at the time of a negative pressure), the first gap of the structural member is narrowed. When the first contacting member achieves contact, the first gap is eliminated. That is, a compressive deformation of the fuel-tank main body is allowed, and its deformation amount is maintained at a given amount at which the first gap is eliminated.

Further, when the opposing walls separate from each other at the time when the fuel-tank main body is expanded (e.g., at the time of a positive pressure), the second gap of the structural member is narrowed. When the second contacting member achieves contact, the second gap is eliminated. That is, an expansion deformation of the fuel-tank main body is allowed, and its deformation amount is maintained at a given amount at which the second gap is eliminated.

In the fuel tank, the structural member may include a first extension member extended from one of the opposing walls toward the other one of the opposing walls, and a second extension member extended from the other one of the opposing walls toward the one of the opposing walls.

The structural member is attainable with a simple structure including the first extension member extended from one of the opposing walls, and the second extension member extended from the other one of the opposing walls.

In the fuel tank, the first contacting member may include a first contacting portion provided in the first extension member, and a first contacted portion provided in that one of the opposing walls which is opposed to the first extension member or the second extension member, the first contacted portion forming the first gap between the first contacted portion and the first contacting portion.

The first contacting portion can be configured with a simple structure in which the first contacting portion is provided in the first extension member, and the first contacted portion is provided in that one of the opposing walls which is opposed to the first extension member or in the second extension member.

In the fuel tank, the second contacting member may include a second contacting portion provided in the first extension member, and a second contacted portion provided in that one of the opposing walls which is opposed to the first extension member or the second extension member, the second contacted portion forming the second gap between the second contacted portion and the second contacting portion.

The second contacting portion can be configured with a simple structure in which the second contacting portion is provided in the first extension member, and the second contacted portion is provided in that one of the opposing walls which is opposed to the first extension member or in the second extension member.

In the fuel tank, the second contacted portion may be provided in an opposed member provided in that one of the opposing walls which is opposed to the first extension member or the second extension member, the opposed member being opposed to the second contacting portion.

When the second contacted portion is provided in the opposed member, it is possible to easily adjust a length of the second gap by changing a shape of the opposed member, or the like.

In the fuel tank, the opposed member may be fixed to that one of the opposing walls which is opposed to the first extension member or the second extension member.

Hereby, a position of the opposed member can be maintained stably, and the number of components can be reduced in comparison with a configuration in which the opposed member is formed separately from the opposing walls and the second extension member. Note that to be "fixed" used herein includes a structure in which the opposed member is formed separately from the opposing walls and the second extension member and is fixed thereto in a later step, and a structure in which the opposed member is formed integrally with the opposing walls or the second extension member.

In the fuel tank, the opposed member may be fitted to the first extension member and the second extension member.

Since the opposed member is fitted to the first extension member and the second extension member, it is possible to easily perform assembling of the opposed member to the first extension member and the second extension member.

In the fuel tank, the structural member may include a first fitting hole formed in the first extension member so that the opposed member is fitted to the first fitting hole, a second fitting hole formed in the second extension member so that the opposed member is fitted to the second fitting hole, a first slit formed in the first extension member in communication with the first fitting hole so that the first slit is opened outside the first extension member, and a second slit formed in the second extension member in communication with the second fitting hole so that the second slit is opened outside the second extension member, the first slit and the second slit are open in the same direction.

It is possible to fit the opposed member to both the first fitting hole of the first extension member and the second fitting hole of the second extension member. It is possible to fit the opposed member to the first fitting hole and the second fitting hole via the first slit formed in the first extension member and via the second slit formed in the second fitting member. Since the second slit is opened outside the second extension member in the same direction as the first slit, it is possible to easily perform an operation to insert the opposed member into the first slit and the second slit.

In the fuel tank, the structural member may include an insertion member provided in either one of the first extension member and the second extension member, and an insertion hole formed in the other one of the first extension member and the second extension member so that the insertion member is inserted in the insertion hole and the first gap and the second gap are formed between the insertion hole and the insertion member.

With a simple structure in which the insertion member is inserted into the insertion hole, it is possible to form the first gap and the second gap between the insertion hole and the insertion member. By adjusting sizes of the insertion member and the insertion hole, it is possible to easily attain desired lengths of the first gap and the second gap.

In the fuel tank, the structural member may include a fixing hole formed in the either one of the first extension member and the second extension member so that the insertion member is inserted in the fixing hole and fixed to the fixing hole.

The insertion member can be fixed to the fixing hole after the insertion member is inserted into the insertion hole and the fixing hole. Accordingly, it is possible to easily perform assembly in comparison with a structure in which the insertion member is fixed to either one of the first extension member and the second extension member.

In the fuel tank, the structural member may include a first engaging portion formed in the first extension member, a second engaging portion formed in the second extension member, and an engaged member to be engaged with the first engaging portion and the second engaging portion when the fuel moves in the fuel-tank main body.

The engaged member is engaged with the first engaging portion and the second engaging portion when the fuel moves in the fuel-tank main body. This restrains a relative movement between the first extension member and the second extension member. Since the first extension member is extended from one of the opposing walls and the second extension member is extended from the other one of the opposing walls, the opposing walls are restrained from coming close to each other or separating from each other. That is, the deformation of the fuel-tank main body at the time when the fuel moves in the fuel-tank main body is restrained.

In the fuel tank, the first extension member and the second extension member may include overlap portions that overlap with each other when viewed in a direction perpendicular to an extending direction of the first extension member and the second extension member; and the structural member may include a first through hole serving as the first engaging portion formed in the overlap portion of the first extension member, a second through hole serving as the second engaging portion formed in the overlap portion of the second extension member, an opposed member opposed to the overlapping portions and configured to come close to the overlap portions when the fuel moves in the fuel tank, and an insertion member provided in the opposed member and serving as the engaged member configured to be inserted into the first through hole and the second through hole when the opposed member comes close to the overlap portions in a state where the first through hole and the second through hole align with each other.

The opposed member comes close to the overlap portions when the fuel moves in the fuel-tank main body. Then, the insertion member is inserted into the first through hole and the second through hole in a state where the first through hole and the second through hole align with each other. This restrains a relative movement between the first extension member and the second extension member. When the insertion member is inserted into the first through hole and the second through hole, it is possible to surely restrain a relative movement between the first extension member and the second extension member. Since the insertion member receives a force of the movement of the fuel in the fuel-tank main body due to the opposed member, the insertion member is surely inserted into the first through hole and the second through hole.

In the fuel tank, the first extension member may be a first tubular member having a tubular shape and extending in a opposed direction in which two opposing walls of the fuel-tank main body oppose, and the second extension member may be a second tubular member placed outside the first tubular member or inside the first tubular member.

Since the second tubular member is placed outside or inside the first tubular member, the overlap portions can be formed in whole circumferences of the first tubular member and the second tubular member.

In the fuel tank, the structural member may be configured such that a plurality of the first through holes is formed in a circumferential direction of the first tubular member and a plurality of the second through holes is formed in a circumferential direction of the second tubular member, and a plurality of opposed members each including the insertion member is provided around the first tubular member and the second tubular member in the circumferential direction.

This makes it possible to restrain a relative movement between the first extension member and the second extension member with respect to the movement of the fuel in multiple directions inside the fuel-tank main body.

In the fuel tank, the structural member may include a spring member configured to bias the opposed member in a direction where the opposed member separates from the overlap portions, so as to maintain a state where the insertion member is not inserted into the first through hole and the second through hole at the time when flow of the fuel is not more than a predetermined amount.

This accordingly makes it possible to restrain the insertion member from being inserted into the first through hole and the second through hole unnecessarily when a force that is weaker than a biasing force of the spring member is applied to the opposed member.

In the fuel tank, the structural member may include an inclined surface provided in the first extension member so as to be inclined with respect to a horizontal direction, a moving member supported by the inclined surface so as to move upward on the inclined surface when receiving lateral acceleration in side view, and an opposed surface provided in the second extension member and configured to face the moving member from above when the moving member moves upward on the inclined surface in side view.

When the moving member moves upward on the inclined surface due to lateral acceleration, the opposed surface is placed above the moving member. Since moving member is placed between the inclined surface and the opposed surface, an approaching amount between the inclined surface and the opposed surface is limited. Since the inclined surface is provided in the first extension member and the opposed surface is provided in the second extension member, it is possible to restrain the opposing walls of the fuel-tank main body from coming close to each other or separating from each other. That is, the deformation of the fuel-tank main body at the time when the lateral acceleration is applied thereto is restrained.

In the fuel tank, the first extension member may be an upper extension member extended from a top wall of the fuel-tank main body toward a bottom wall of the fuel-tank main; the second extension member may be a lower extension member extended from the bottom wall of the fuel-tank main body toward the top wall of the fuel-tank main; the inclined surface may be provided in the upper extension member; and the opposed surface may be provided in the lower extension member.

Since the inclined surface is provided in the upper extension member, and the opposed surface is provided in the lower extension member, an approaching amount between the inclined surface and the opposed surface is limited at the time when the upper extension member moves upward relative to the lower extension member. This makes it possible to restrain a relative movement between the top wall and the bottom wall of the fuel-tank main body in a direction where they separate from each other.

In the fuel tank, the inclined surface may be inclined upward from a center part placed in a relatively low position toward outside in a whole circumference in side view.

Hereby, as long as acceleration is along a lateral direction, even if the acceleration is applied in any direction, the moving member moves upward on the inclined surface so as to be placed between the inclined surface and the opposed surface. This makes it possible to restrain a relative movement between the first extension member and the second extension member with respect to the lateral acceleration in multiple directions inside the fuel-tank main body.

In the fuel tank, the moving member may be a ball.

Since the ball rolls on the inclined surface to move upward, unnecessary resistance does not occur with respect to the upward movement. Further, conditions for the ball to move upward on the inclined surface is easily adjustable by an inclination angle of the inclined surface.

In the fuel tank, a gap between the inclined surface and the opposed surface constitutes the second gap.

Since the second gap can be constituted by using the inclined surface and the opposed surface, it is possible to attain a simple structure of the structural member.

In the fuel tank, the lower extension member and the upper extension member may include overlap portions that overlap with each other when viewed in a horizontal direction; and the structural member may include an inclination hole penetrating through the overlap portion of the upper extension member and constituting the inclined surface so as to support the moving member, an opposed hole penetrating through the overlap portion of the lower extension member and constituting the opposed surface so that the moving member is inserted in the opposed hole, and a moving hole formed continuously from at least one of the inclination hole and the opposed hole and the moving hole configured such that the moving member moves in the moving hole at the time when the upper extension member and the lower extension member move upward and downward relative to each other in side view.

When horizontal acceleration is applied to the moving member supported by the inclined surface of the inclination hole, the moving member moves upward on the inclined surface. The opposed surface of the opposed hole is placed above the moving member. Since the moving member is placed between the inclined surface and the opposed surface, an approaching amount between the inclined surface and the opposed surface is limited. Since the inclined surface is provided in the first extension member and the opposed surface is provided in the second extension member, it is possible to restrain the opposing walls of the fuel-tank main body from separating from each other. That is, the deformation of the fuel-tank main body at the time when the lateral acceleration in the lateral direction is applied thereto is restrained.

The moving hole is provided continuously from at least one of the inclination hole and the opposed hole. When the moving member moves in the moving hole at the time of a relative movement between the upper extension member and the lower extension member in the up-down direction in side view, the opposing walls are allowed to come close to each other and separate from each other in a range of the moving hole.

With the above configuration, the present invention is able to maintain given deformation amounts of a compressive deformation and an expansion deformation of the fuel-tank main body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14A is an enlarged sectional view partially illustrating the fuel tank according to the sixth embodiment of the present invention in a state where the fuel tank is not deformed;

FIG. 16C is an enlarged sectional view partially illustrating the fuel tank according to the seventh embodiment of the present invention in a state where the fuel tank is deformed in an expanding manner;

FIG. 17 is an exploded side view illustrating an inside of a fuel tank according to an eighth embodiment of the present invention;

DETAILED DESCRIPTION OF EMBODIMENTS

A fuel tank according to a first embodiment of the present invention will be described below with reference to the drawings.

Figure 1:
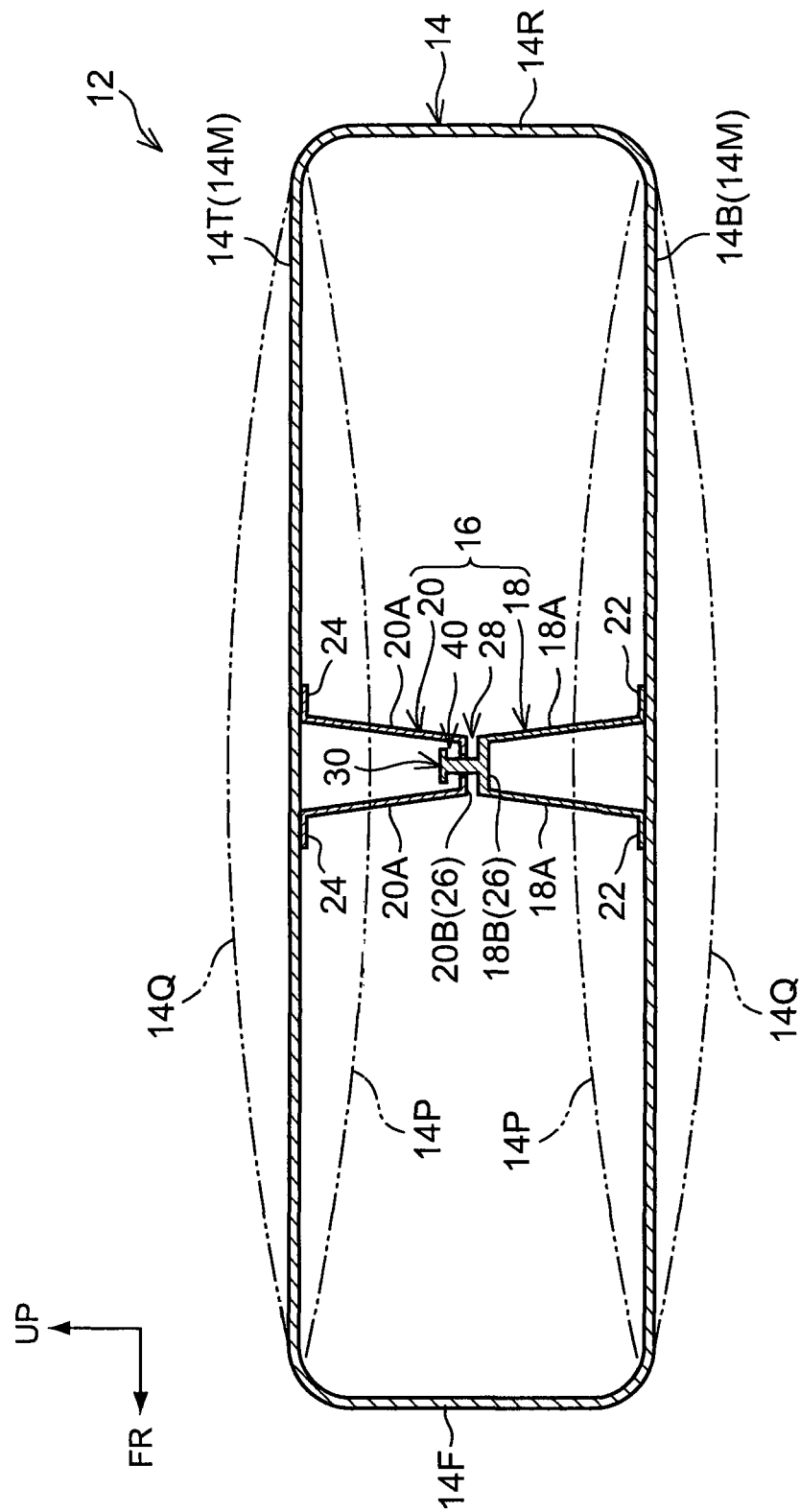
FIG. 1 is a drawing of a longitudinal section illustrating a fuel tank according to a first embodiment of the present invention.

FIG. 1 illustrates a fuel tank 12 according to the first embodiment of the present invention. Hereinafter, in the figure, an arrow FR indicates a vehicle front side direction, an arrow UP indicates an upper direction, and an arrow W indicates a vehicle width direction. Note that, in FIG. 1, a lateral direction of a plane of paper is regarded as a vehicle front-rear direction, but the lateral direction of the plane of paper may be the vehicle width direction.

The fuel tank 12 includes a fuel-tank main body 14 that is able to store fuel therein. The fuel-tank main body 14 is made of resin in the present embodiment. The fuel-tank main body 14 is generally formed in a shape (for example, a box shape of a generally rectangular solid in the example illustrated herein) in which fuel can be stored. Particularly, in the present embodiment, the fuel-tank main body 14 is formed in a rectangular shape having a bottom wall 14B, a top wall 14T, a front wall 14F, and a rear wall 14R in a section illustrated in FIG. 1. In this section, the bottom wall 14B and the top wall 14T are longer than the front wall 14F and the rear wall 14R. The top wall 14T and the bottom wall 14B are an example of opposing walls 14M according to the present invention.

The fuel-tank main body 14 includes a structural member 16 provided therein. In the first embodiment, the structural member 16 includes a lower-side reinforcing member 18 extending from the bottom wall 14B toward the top wall 14T, and an upper-side reinforcing member 20 extending from the top wall 14T toward the bottom wall 14B. In the present embodiment, the lower-side reinforcing member 18 and the upper-side reinforcing member 20 reinforce the fuel-tank main body 14.

The lower-side reinforcing member 18 is formed generally in a trapezoidal shape having paired longitudinal walls 18A extended diagonally upward from the bottom wall 14B of the fuel-tank main body 14, and a lateral wall 18B continued from tip ends (upper ends) of the longitudinal walls 18A. The lower-side reinforcing member 18 includes mounting flanges 22 in base ends (bottom ends) of the longitudinal walls 18A, so that the lower-side reinforcing member 18 is attached to the bottom wall 14B of the fuel-tank main body 14 via the mounting flanges 22 by welding, rivet, or the like.

The upper-side reinforcing member 20 is formed generally in a trapezoidal shape having paired longitudinal walls 20A extended diagonally upward from a top face of the fuel-tank main body 14, and a lateral wall 20B continued from tip ends (bottom ends) of the longitudinal walls 20A. The upper-side reinforcing member 20 includes mounting flanges 24 in base ends (upper ends) of the longitudinal walls 20A, so that the upper-side reinforcing member 20 is attached to the top wall 14T of the fuel-tank main body 14 via the mounting flanges 24 by welding, rivet, or the like.

The lateral wall 18B of the lower-side reinforcing member 18 is opposed parallel to the lateral wall 20B of the upper-side reinforcing member 20, and a first gap 28 having a predetermined distance D1 in an up-down direction is formed between the lateral walls 18B, 20B.

When the top wall 14T and the bottom wall 14B of the fuel-tank main body 14 relatively come close to each other and the lower-side reinforcing member 18 and the upper-side reinforcing member 20 relatively come close to each other, the first gap 28 is narrowed gradually. When the first gap 28 between the lateral wall 18B and the lateral wall 20B is eliminated and the lateral wall 18B comes in contact with the lateral wall 20B, the top wall 14T and the bottom wall 14B of the fuel-tank main body 14 are prevented from coming close to each other.

An opposed member 30 is formed to extend upward from the lateral wall 18B of the lower-side reinforcing member 18. The opposed member 30 includes a columnar support 32 extending upward from a center of the lateral wall 18B, and a disciform opposed plate 34 formed on a tip end (an upper end) of the support 32.

Particularly, in the first embodiment, the opposed member 30 is formed integrally with the lower-side reinforcing member 18 or is fixed to the lower-side reinforcing member 18, so that the lower-side reinforcing member 18 and the opposed member 30 are integrated with each other.

A fitting hole 36 and an insertion slit 38 are formed in the lateral wall 20B of the upper-side reinforcing member 20. The insertion slit 38 communicates the fitting hole 36 with an outside of the lateral wall 20B, and a communication portion with the outside serves as an insertion opening 38K. The support 32 cam be inserted into the insertion slit 38 from the insertion opening 38K, and then fitted to the fitting hole 36. An inside diameter of the fitting hole 36 is slightly larger than an outside diameter of the support 32, so that the support 32 (the opposed member 30) is movable upward and downward relative to the lateral wall 20B (the upper-side reinforcing member 20).

The opposed plate 34 is opposed parallel to the lateral wall 20B of the upper-side reinforcing member 20, and a second gap 40 having a predetermined distance D2 is formed therebetween.

The second gap 40 is narrowed gradually when the top wall 14T and the bottom wall 14B of the fuel-tank main body 14 relatively separate from each other and the lower-side reinforcing member 18 and the upper-side reinforcing member 20 relatively separate from each other. When the second gap 40 between the opposed plate 34 and the lateral wall 20B is eliminated and the opposed plate 34 comes in contact with the lateral wall 20B, the separation between the top wall 14T and the bottom wall 14B of the fuel-tank main body 14 is prevented.

In the structure of the first embodiment, the lateral wall 20B is an example of the "second contacting portion" of the present invention, and the opposed plate 34 is an example of the "second contacted portion" of the present invention. Accordingly, in the first embodiment, the upper-side reinforcing member 20 is an example of the "first extension member" of the present invention, and the lower-side reinforcing member 18 is an example of the "second extension member" of the present invention. Further, in the first embodiment, the lateral wall 20B is an example of the "first contacting portion" of the present invention (doubling as the "second contacting portion"), and the lateral wall 18B is an example of the "first contacted portion" of the present invention.

Next will be described an effect of the fuel tank 12 of the first embodiment.

Figure 3A:
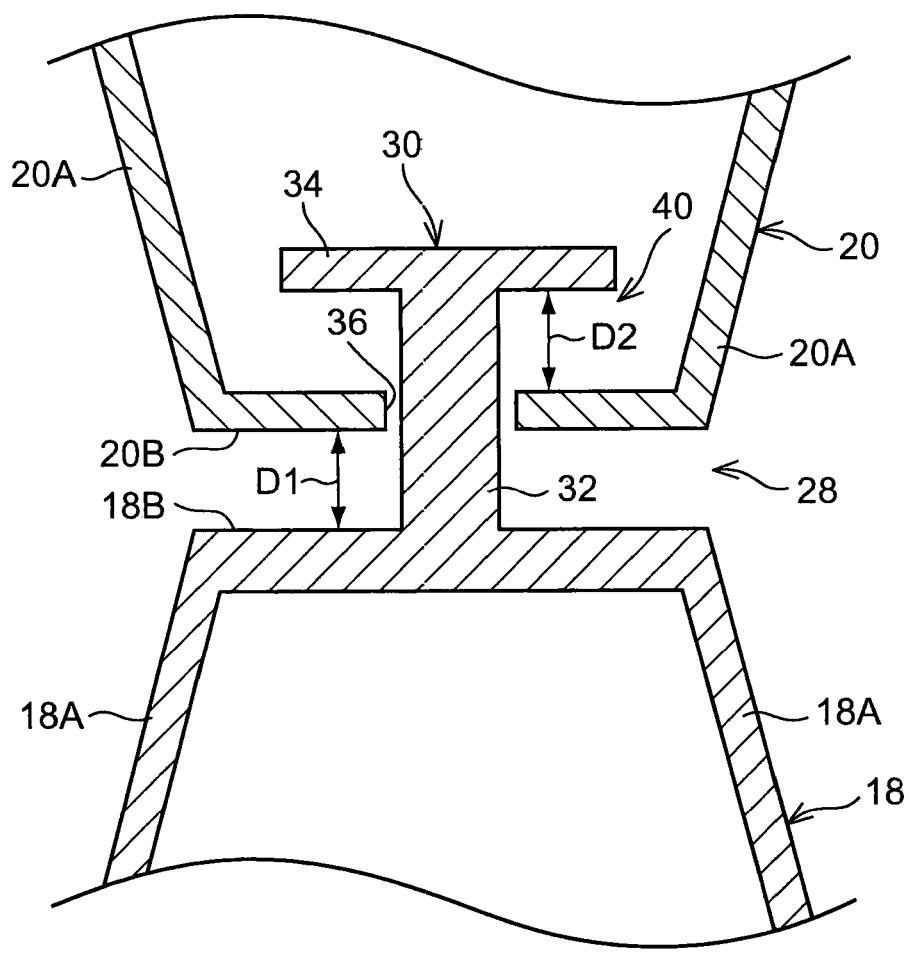
FIG. 3A is an enlarged sectional view partially illustrating the fuel tank according to the first embodiment of the present invention in a state where the fuel tank is not deformed.

When a tank internal pressure is at the same level as an atmospheric pressure, the fuel-tank main body 14 is not expanded or compressed. That is, as illustrated by a continuous line in FIG. 1, the top wall 14T and the bottom wall 14B of the fuel-tank main body 14 do not curve greatly, but are kept generally in a plane state. At this time, as illustrated in FIG. 3A, the first gap 28 having the predetermined distance D1 is formed between the lateral wall 18B of the lower-side reinforcing member 18 and the lateral wall 20B of the upper-side reinforcing member 20. Further, the second gap 40 having the predetermined distance D2 is formed between the opposed plate 34 of the opposed member 30 and the lateral wall 20B of the upper-side reinforcing member 20.

When the tank internal pressure of the fuel-tank main body 14 becomes a negative pressure (the tank internal pressure becomes lower than the external atmospheric pressure), the first gap 28 is narrowed gradually and the lower-side reinforcing member 18 and the upper-side reinforcing member 20 come close to each other. That is, as illustrated by an alternate long and two short dashes line 14P in FIG. 1, central portions of the top wall 14T and the bottom wall 14B of the fuel-tank main body 14 are allowed to curve in a direction where the central portions come close to each other, so that the fuel-tank main body 14 is compressively deformed. Note that FIG. 1 illustrates a deformation degree of the fuel-tank main body 14 in a magnified manner as compared with an actual deformation degree.

Figure 3B:
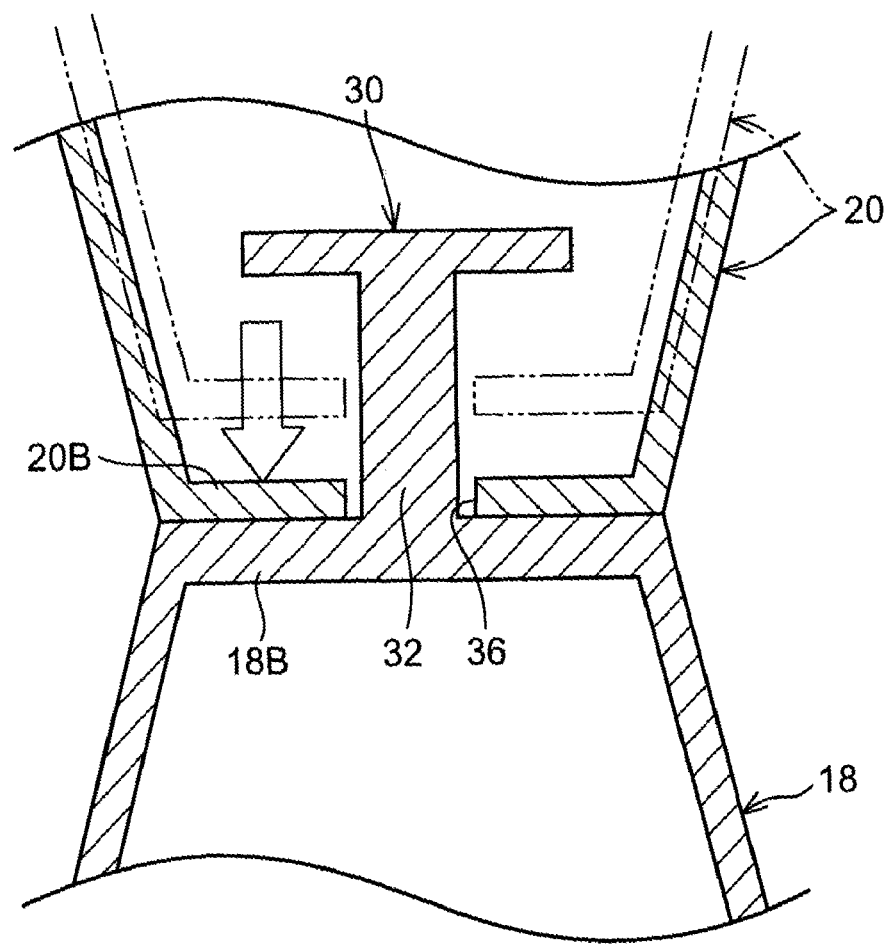
FIG. 3B is an enlarged sectional view partially illustrating the fuel tank according to the first embodiment of the present invention in a state where the fuel tank is compressively deformed.

As illustrated in FIG. 3B, when the first gap 28 between the lateral wall 18B of the lower-side reinforcing member 18 and the lateral wall 20B of the upper-side reinforcing member 20 is eliminated and the lateral wall 18B comes in contact with the lateral wall 20B, the lower-side reinforcing member 18 and the upper-side reinforcing member 20 are prevented from coming close to each other, and the top wall 14T and the bottom wall 14B of the fuel-tank main body 14 are also prevented from curving.

Thus, in the fuel tank 12 of the first embodiment, at the time of the negative pressure of the fuel-tank main body 14, a compressive deformation of the fuel-tank main body 14 is allowed as illustrated by the alternate long and two short dashes line 14P in FIG. 1, and its deformation amount is restricted to a given amount at which the first gap 28 is eliminated.

Figure 3C:
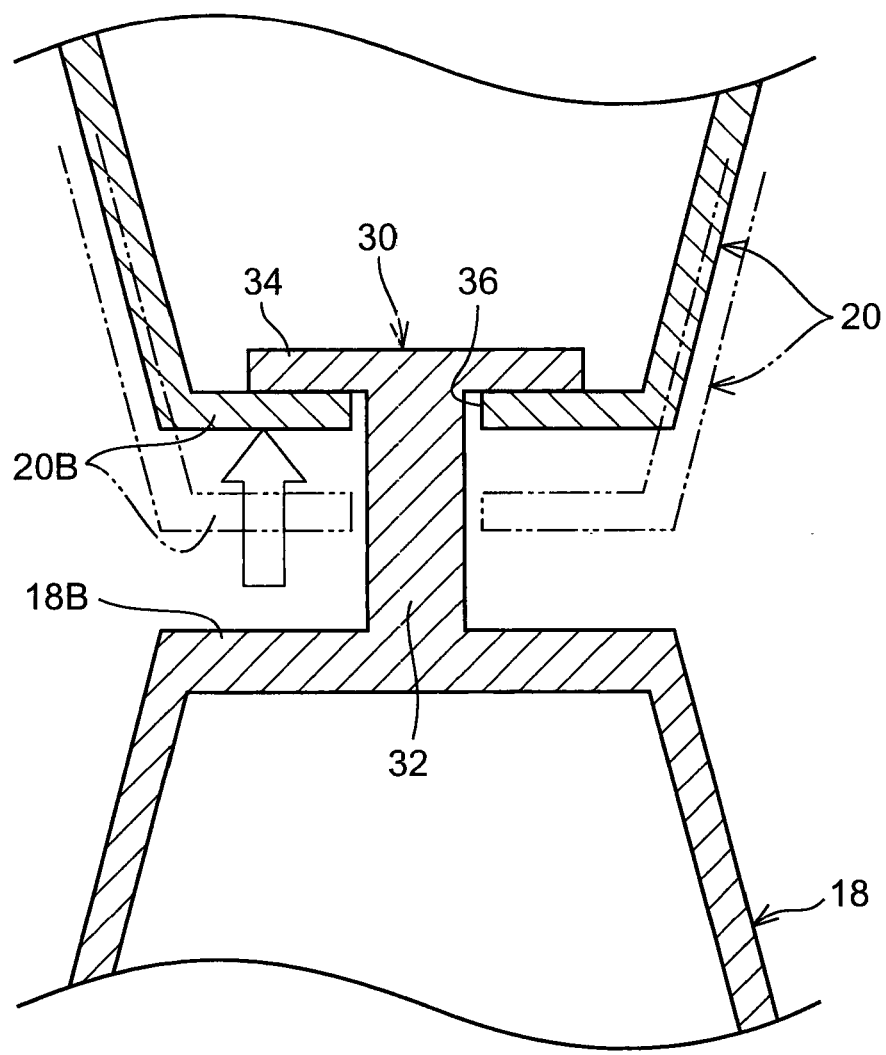
FIG. 3C is an enlarged sectional view partially illustrating the fuel tank according to the first embodiment of the present invention in a state where the fuel tank is deformed in an expanding manner.

In the meantime, when the tank internal pressure of the fuel-tank main body 14 becomes a positive pressure (the tank internal pressure becomes higher than the external atmospheric pressure), the second gap 40 is narrowed gradually and the lower-side reinforcing member 18 and the upper-side reinforcing member 20 separate from each other. That is, as illustrated by an alternate long and two short dashes line 14O in FIG. 1, the central portions of the top wall 14T and the bottom wall 14B of the fuel-tank main body 14 are allowed to curve in a direction where the central portions separate from each other, so that the fuel-tank main body 14 is deformed in an expanding manner. Then, as illustrated in FIG. 3C, when the second gap 40 between the opposed plate 34 and the lateral wall 20B of the upper-side reinforcing member 20 is eliminated and the opposed plate 34 comes in contact with the lateral wall 20B, the separation between the lower-side reinforcing member 18 and the upper-side reinforcing member 20 is prevented, and the top wall 14T and the bottom wall 14B of the fuel-tank main body 14 are also prevented from curving.

Thus, in the fuel tank 12 of the first embodiment, at the time of the positive pressure of the fuel-tank main body 14, an expansion deformation of the fuel-tank main body 14 is allowed as illustrated by the alternate long and two short dashes line 14Q in FIG. 1, and its deformation amount is restricted to a given amount at which the second gap 40 is eliminated.

The first gap 28 is constituted by the lateral wall 18B of the lower-side reinforcing member 18 and the lateral wall 20B of the upper-side reinforcing member 20. In view of this, when the distance D1 thereof is adjusted, it is possible to adjust deformation amounts of the top wall 14T and the bottom wall 14B at the time of the negative pressure of the fuel-tank main body 14, to desired deformation amounts.

Similarly, since the second gap 40 is constituted by the opposed plate 34 of the opposed member 30 and the lateral wall 18B of the lower-side reinforcing member 18, it is possible to adjust the distance D2 thereof by changing a shape of the opposed member 30. Hereby, it is also possible to adjust deformation amounts of the top wall 14T and the bottom wall 14B at the time of the positive pressure of the fuel-tank main body 14, to desired deformation amounts.

Note that the first embodiment deals with an example in which the opposed member 30 provided in the lower-side reinforcing member 18 is fitted to the upper-side reinforcing member 20, but alternatively, the opposed member 30 may be provided in the upper-side reinforcing member 20 and fitted to the lower-side reinforcing member 18. In this configuration, the upper-side reinforcing member 20 is an example of the "second extension member" of the present invention, and the lower-side reinforcing member 18 is an example of the "first extension member" of the present invention. Further, the lateral wall 18B is an example that serves as the "first contacting portion" and the "second contacting portion" of the present invention, and the lateral wall 20B is an example of the "first contacted portion" of the present invention. In short, a relationship between the "first contacting portion" and the "first contacted portion" is relative, and a relationship between the "second contacting portion" and the "second contacted portion" is also relative.

In the first embodiment, since the opposed member 30 is integrated with the lower-side reinforcing member 18 or the upper-side reinforcing member 20, the number of components is reduced in comparison with a configuration in which the opposed member 30 is formed separately from the lower-side reinforcing member 18 and the upper-side reinforcing member 20. This makes it possible to achieve a simple structure and to stably maintain a position of the opposed member 30.

Figure 4:
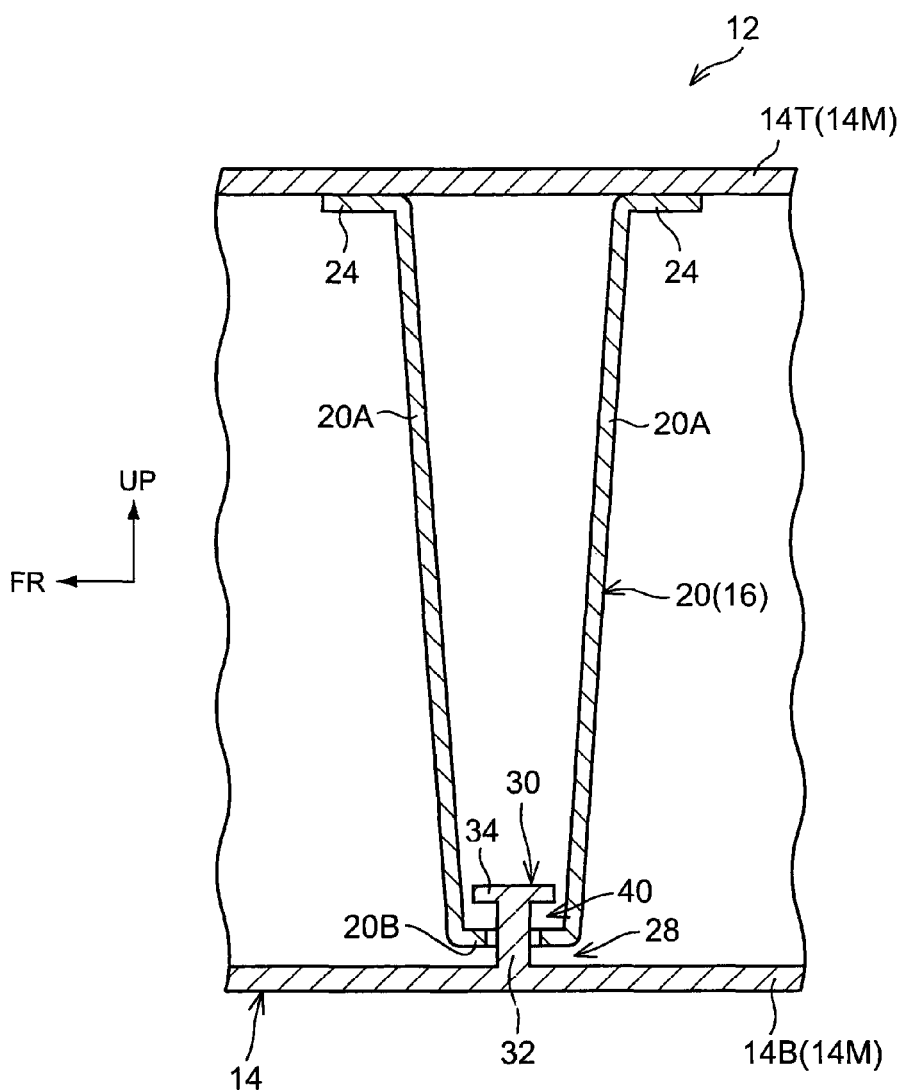
FIG. 4 is a drawing of a longitudinal section partially illustrating a fuel tank according to a modification of the first embodiment of the present invention.

The above description deals with an example in which the first gap 28 is formed between the lower-side reinforcing member 18 and the upper-side reinforcing member 20. However, as illustrated in a modification of the first embodiment in FIG. 4, for example, the lower-side reinforcing member 18 may not be provided, and the lateral wall 20B of the upper-side reinforcing member 20 may be provided close to the bottom wall 14B of the fuel-tank main body 14, so as to form the first gap 28 between the lateral wall 20B and the bottom wall 14B. In the modification illustrated in FIG. 4, the opposed member 30 is directly provided on the bottom wall 14B of the fuel-tank main body 14.

Next will be described a second embodiment of the present invention.

Figure 5:
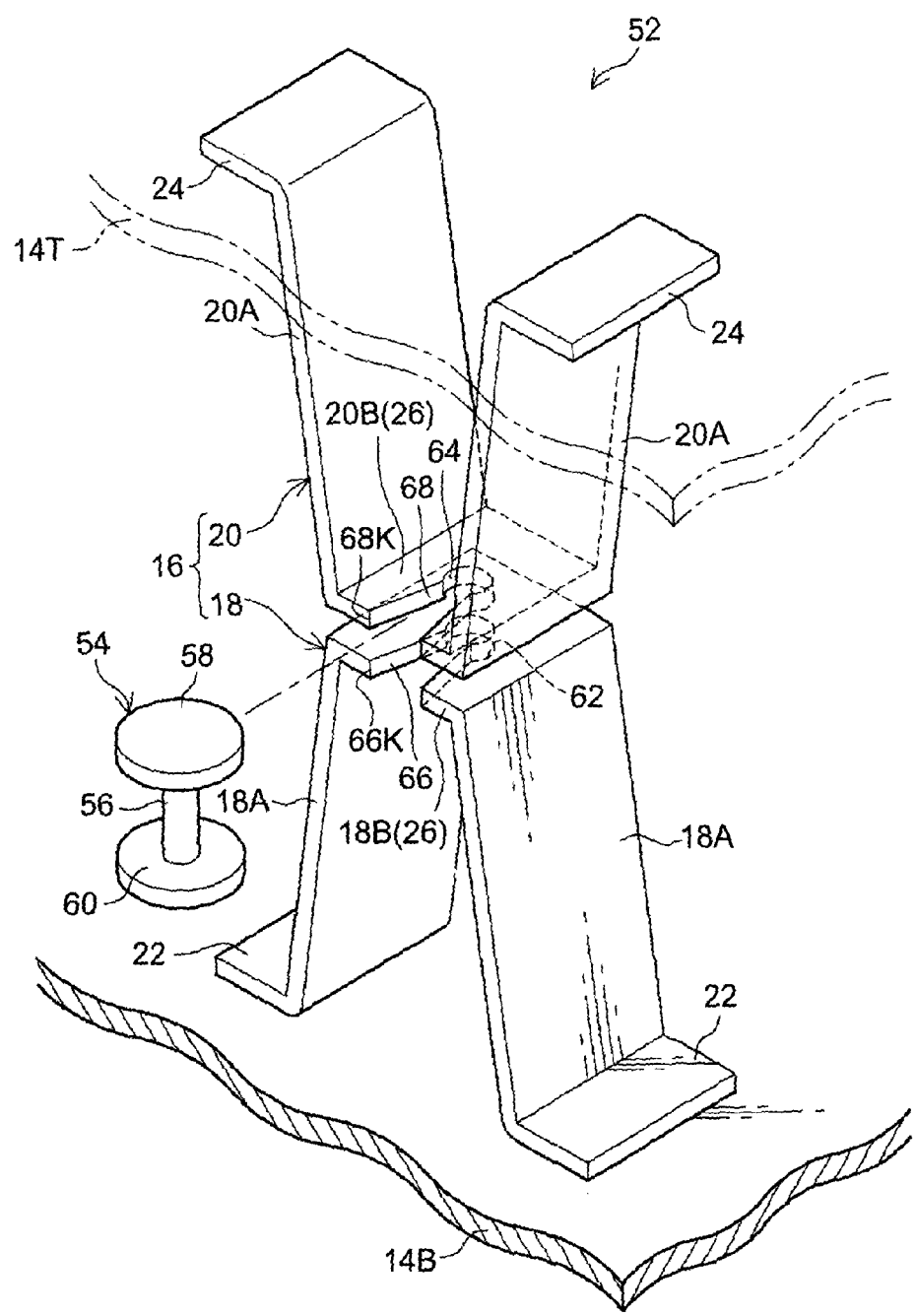
FIG. 5 is a perspective view illustrating an inside of a fuel tank according to a second embodiment of the present invention.

FIG. 5 illustrates a fuel tank 52 according to the second embodiment. In the second embodiment, the same constituent, member, or the like as in the first embodiment has the same reference sign as in the first embodiment, and a detailed description thereof is omitted. Further, a general configuration of the fuel tank in the second embodiment is similar to the fuel tank 12 of the first embodiment (see FIG. 1), so that the fuel tank in the second embodiment is not illustrated herein.

Figure 2:
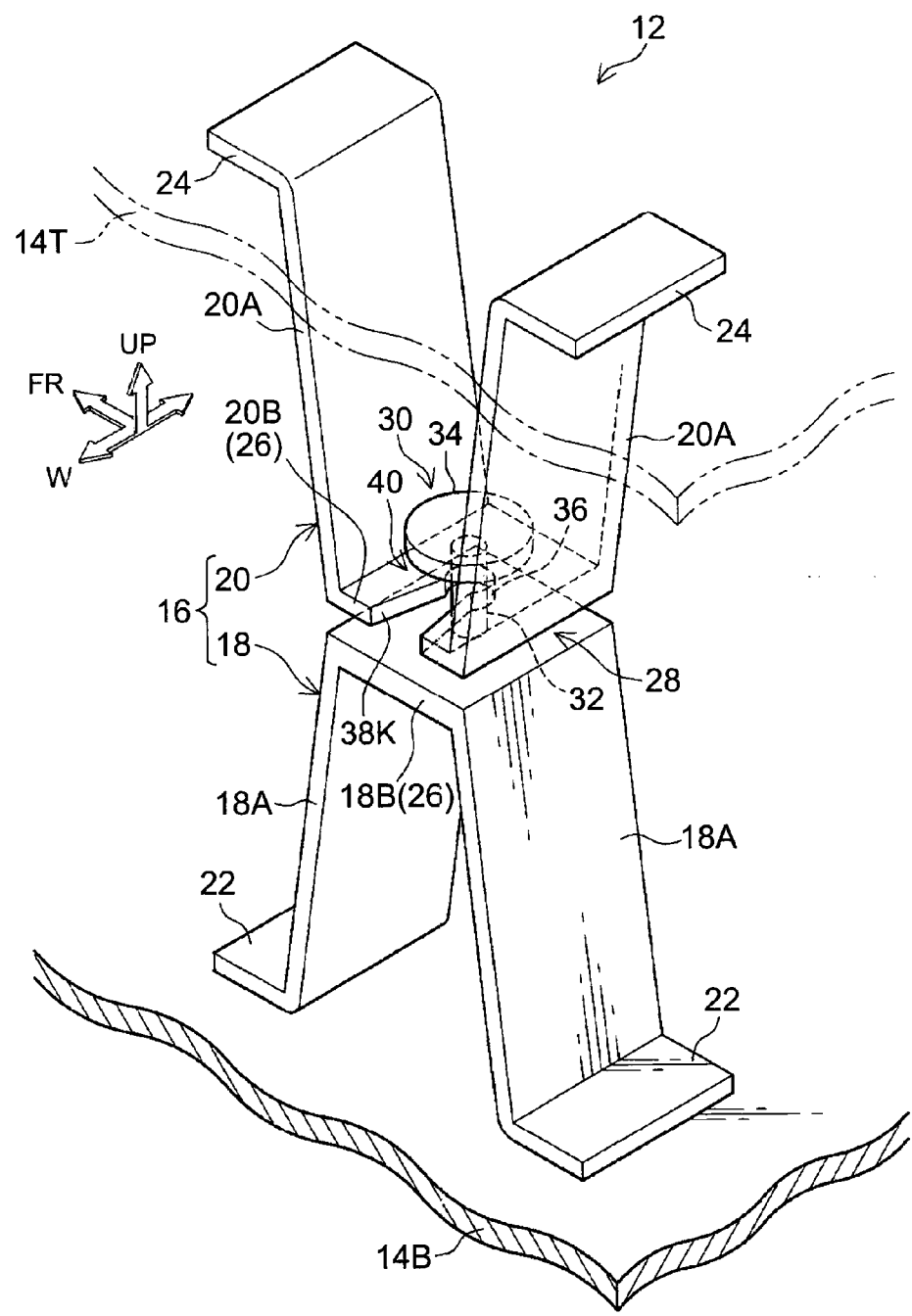
FIG. 2 is a perspective view illustrating an inside of the fuel tank according to the first embodiment of the present invention.

In the second embodiment, that opposed member 30 (see FIG. 2, etc.) according to the first embodiment which is integrated with the lower-side reinforcing member 18 is not provided, but an opposed member 54 formed separately from the lower-side reinforcing member 18 and the upper-side reinforcing member 20 is provided.

The opposed member 54 of the second embodiment includes a columnar support 56, and a disciform support plate 58 and a disciform opposed plate 60 formed at both ends (an upper end and a bottom end) of the support 56.

In the second embodiment, fitting holes 62, 64 and insertion slits 66, 68 are formed in a lateral wall 18B of the lower-side reinforcing member 18 and a lateral wall 20B of the upper-side reinforcing member 20. The fitting holes 62, 64 and the insertion slits 66, 68 are formed at the same position in the same shape when viewed in a normal line direction (the up-down direction) of the lateral walls 18B, 20B. More specifically, inside diameters of the fitting holes 62, 64 are slightly larger than an outside diameter of the support 56, and the support 56 (the opposed member 54) is movable upward and downward relative to the lateral walls 18B, 20B.

The insertion slits 66, 68 communicate the fitting holes 62, 64 with outsides of the lateral walls 18B, 20B, and communication portions with the outsides serve as insertion openings 66K, 68K. The support 56 can be inserted into the insertion slits 66, 68 from the openings 66K, 68K, so as to be fitted to the fitting holes 62, 64. Particularly, in the second embodiment, the insertion openings 66K, 68K of the insertion slits 66, 68 are opened in the same direction.

In the configuration of the second embodiment, the upper-side reinforcing member 20 is an example of the "second extension member" of the present invention, and the lower-side reinforcing member 18 is an example of the "first extension member" of the present invention. Further, the lateral wall 18B is an example that serves as the "first contacting portion" and the "second contacting portion" of the present invention, and the lateral wall 20B is an example of the "first contacted portion" of the present invention.

Figure 6A:
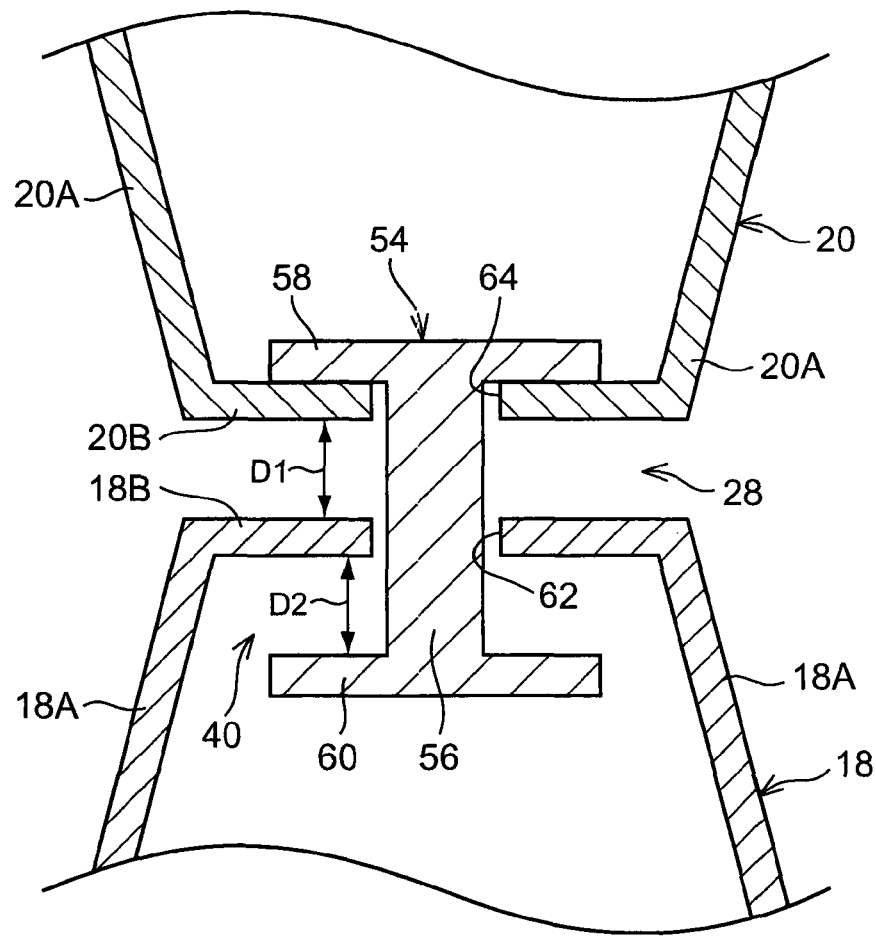
FIG. 6A is an enlarged sectional view partially illustrating the fuel tank according to the second embodiment of the present invention in a state where the fuel tank is not deformed.

In the fuel tank 52 of the second embodiment, when a tank internal pressure in the fuel tank 52 is at the same level as an atmospheric pressure, a fuel-tank main body 14 is not expanded or compressed. At this time, as illustrated in FIG. 6A, the opposed member 54 is supported in such a state that the support plate 58 is moved down by gravity to a position where the support plate 58 comes in contact with the lateral wall 20B of the upper-side reinforcing member 20. Substantially, the opposed member 54 is provided in the upper-side reinforcing member 20. A second gap 40 is formed between the opposed plate 60 and the lateral wall 18B of the lower-side reinforcing member 18.

Figure 6B:
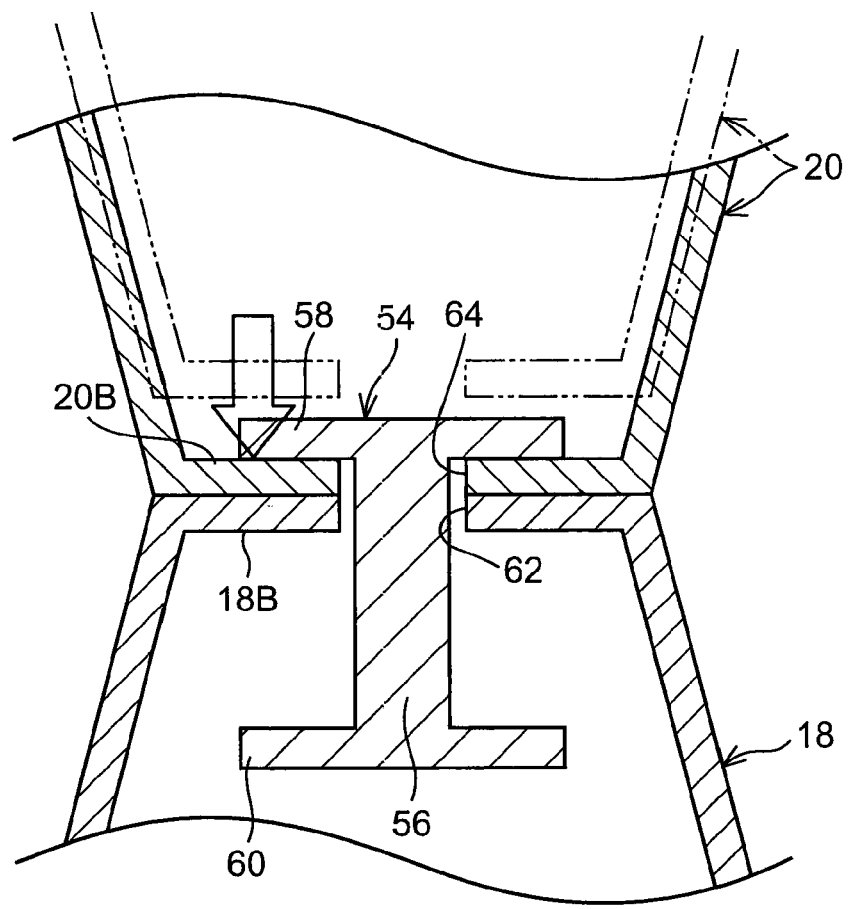
FIG. 6B is an enlarged sectional view partially illustrating the fuel tank according to the second embodiment of the present invention in a state where the fuel tank is compressively deformed.

In the second embodiment, similarly to the first embodiment, when the tank internal pressure of the fuel-tank main body 14 becomes a negative pressure, a first gap 28 is narrowed gradually and the lower-side reinforcing member 18 and the upper-side reinforcing member 20 come close to each other. Hereby, central portions of a top wall 14T and a bottom wall 14B of the fuel-tank main body 14 are allowed to curve in a direction where the central portions come close to each other. As illustrated in FIG. 6B, when the first gap 28 between the lateral wall 18B of the lower-side reinforcing member 18 and the lateral wall 20B of the upper-side reinforcing member 20 is eliminated and the lateral wall 18B comes in contact with the lateral wall 20B, the top wall 14T and the bottom wall 14B of the fuel-tank main body 14 are prevented from curving.

Figure 6C:
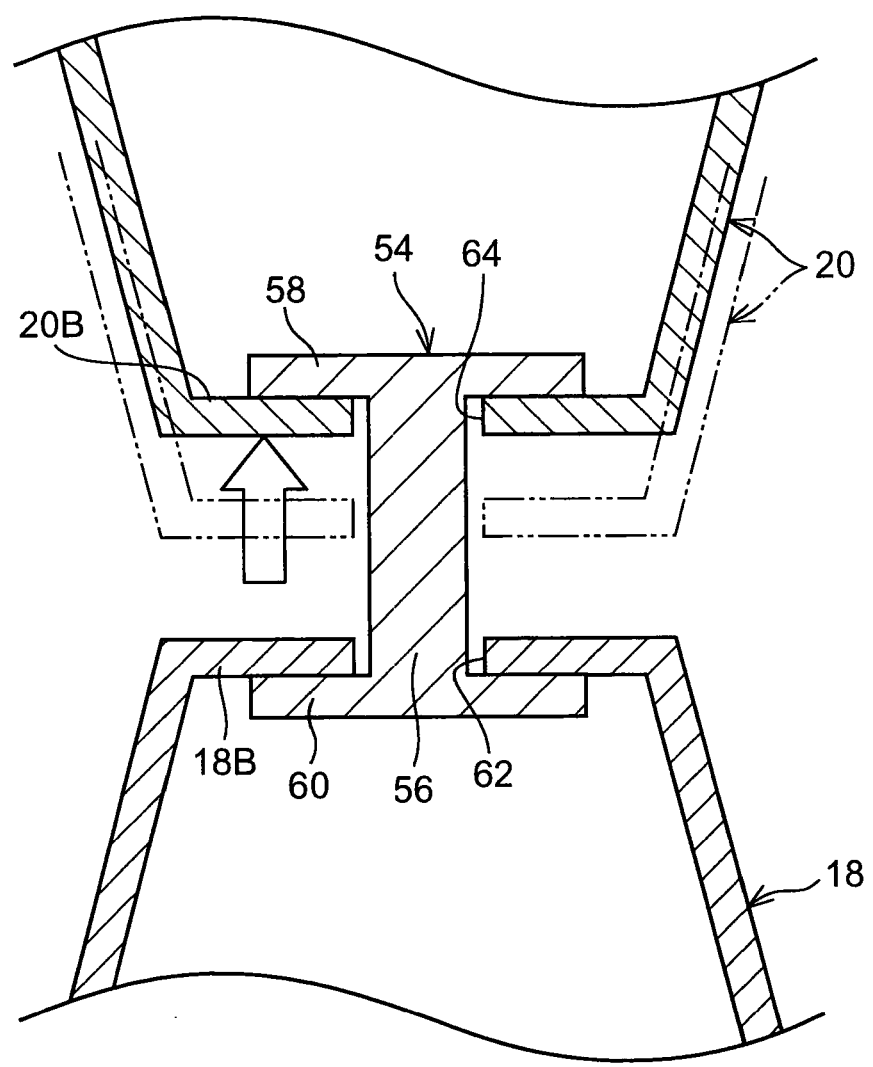
FIG. 6C is an enlarged sectional view partially illustrating the fuel tank according to the second embodiment of the present invention in a state where the fuel tank is deformed in an expanding manner.

In the second embodiment, when the tank internal pressure of the fuel-tank main body 14 becomes a positive pressure, the second gap 40 is narrowed gradually and the lower-side reinforcing member 18 and the upper-side reinforcing member 20 separate from each other. Hereby, the central portions of the top wall 14T and the bottom wall 14B of the fuel-tank main body 14 are allowed to curve in a direction where the central portions separate from each other. As illustrated in FIG. 6C, when the second gap 40 between the opposed plate 60 and the lateral wall 18B of the lower-side reinforcing member 18 is eliminated and the opposed plate 60 comes in contact with the lateral wall 18B, the top wall 14T and the bottom wall 14B of the fuel-tank main body 14 are prevented from curving.

That is, even in the fuel tank 52 of the second embodiment, a compressive deformation of the fuel-tank main body 14 is allowed at the time of the negative pressure of the fuel-tank main body 14, and its deformation amount is restricted to a given amount at which the first gap 28 is eliminated. Further, an expansion deformation of the fuel-tank main body 14 is allowed at the time of the positive pressure of the fuel-tank main body 14, and its deformation amount is restricted to a given amount at which the second gap 40 is eliminated.

Besides, in the second embodiment, the opposed member 54 formed separately from the lower-side reinforcing member 18 and the upper-side reinforcing member 20 is fitted to the fitting hole 62, 64 from the insertion slits 66, 68. That is, the opposed member 54 is fitted to the fitting hole 62, 64 in a state where the lower-side reinforcing member 18 and the upper-side reinforcing member 20 are opposed to each other so that the lateral walls 18B, 20B are placed in a position where the lateral walls 18B, 20B form the first gap 28. This allows a fitting operation to be performed easily.

Particularly, the insertion openings 66K, 68K of the insertion slit 66 of the lower-side reinforcing member 18 and the insertion slit 68 of the upper-side reinforcing member 20 are opened in the same direction. Accordingly, when the opposed member 54 is just slid in one direction toward the fitting hole 62, 64 from the insertion openings 66K, 68K, it is possible to fit the opposed member 54 to the fitting hole 62, 64.

In the second embodiment, an inside diameter of the fitting hole 64 may be slightly smaller than an outside diameter of the support 56, so that the fitting hole 64 holds the support 56 in a close contact manner (the opposed member 54 is fixed to the upper-side reinforcing member 20).

Next will be described a third embodiment of the present invention.

Figure 7:
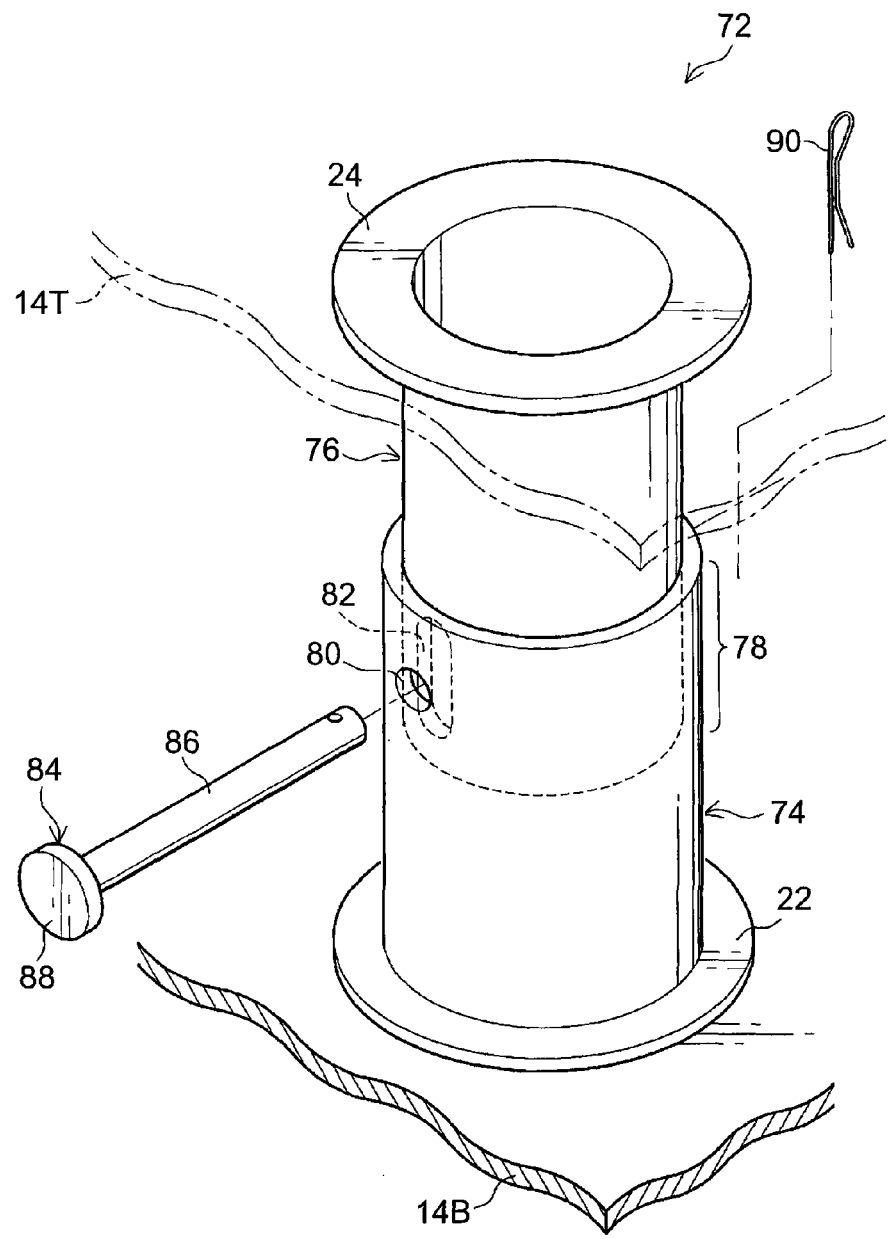
FIG. 7 is a perspective view illustrating an inside of a fuel tank according to a third embodiment of the present invention.

FIG. 7 illustrates a fuel tank 72 according to the third embodiment. Even in the third embodiment, the same constituent, member, or the like as in the first embodiment has the same reference sign as in the first embodiment, and a detailed description thereof is omitted. Further, a general configuration of the fuel tank in the third embodiment is similar to the fuel tank 12 of the first embodiment (see FIG. 1), so that the fuel tank in the third embodiment is not illustrated herein.

In the third embodiment, a lower-side reinforcing member 74 is extended from a bottom wall 14B of a fuel-tank main body 14 toward a top wall 14T thereof, and an upper-side reinforcing member 76 is extended from the top wall 14T toward the bottom wall 14B. When viewed in a lateral direction (in a vehicle front-rear direction), an overlap portion 78 where the lower-side reinforcing member 74 partially overlaps with the upper-side reinforcing member 76 is formed.

In the example illustrated in FIG. 7, the lower-side reinforcing member 74 is formed in a tubular shape, and the upper-side reinforcing member 76 is also formed in a tubular shape. The upper-side reinforcing member 76 is placed inside the lower-side reinforcing member 74. Alternatively, the lower-side reinforcing member 74 may be placed inside the upper-side reinforcing member 76. Further, at least one of the lower-side reinforcing member 74 and the upper-side reinforcing member 76 may be formed in a plate-like shape.

Figure 8A:
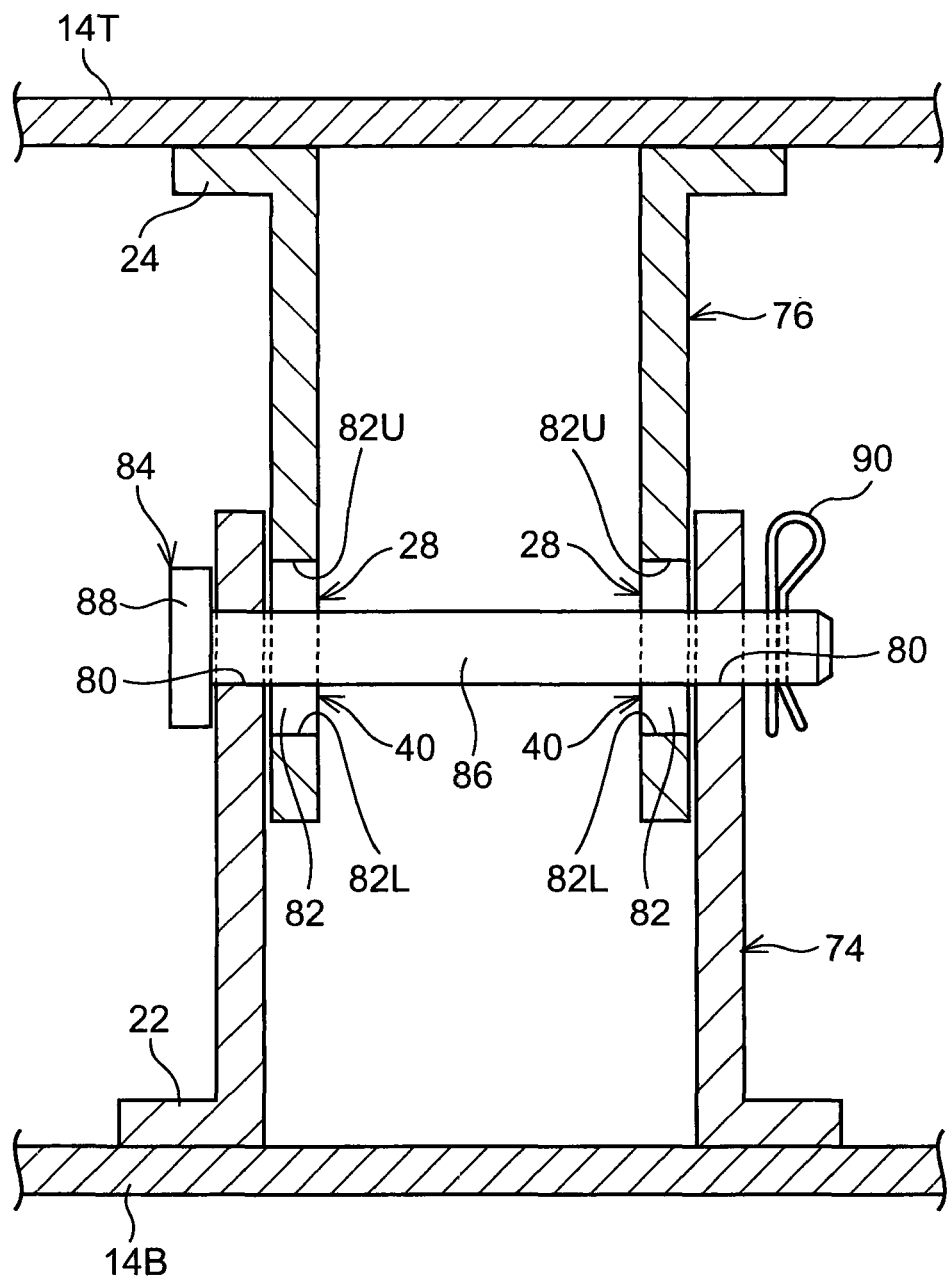
FIG. 8A is an enlarged sectional view partially illustrating a fuel tank according to a third embodiment of the present invention in a state where the fuel tank is not deformed.

In the overlap portion 78, a fixing hole 80 is formed in either one of the lower-side reinforcing member 74 and the upper-side reinforcing member 76, and an insertion hole 82 is formed in the other one of them. In the example illustrated in FIG. 7, the fixing hole 80 is formed in the lower-side reinforcing member 74, and the insertion hole 82 is formed in the upper-side reinforcing member 76. Since the lower-side reinforcing member 74 is formed in a tubular shape, two fixing holes 80 are formed therein so as to be opposed to each other as can be seen from FIG. 8A. Similarly, since the upper-side reinforcing member 76 is formed in a tubular shape, two insertion holes 82 are formed therein so as to be opposed to each other.

An insertion member 84 is inserted into the fixing holes 80 and the insertion holes 82. The insertion member 84 includes a cylindrical insertion columnar portion 86, a stopper circular plate portion 88 formed in one end of the insertion columnar portion 86 by increasing a diameter thereof, and a stopper pin 90 provided in the other end of the insertion columnar portion 86.

In the third embodiment, in a state where the fixing holes 80 and the insertion holes 82 are aligned, the insertion columnar portion 86 is inserted into the fixing holes 80 and the insertion holes 82.

An inside diameter of the fixing holes 80 is slightly larger than an outside diameter of the insertion columnar portion 86, but is smaller than an outside diameter of the stopper circular plate portion 88. Accordingly, the stopper circular plate portion 88 prevents the one end of the insertion columnar portion 86 from falling off. Further, the stopper pin 90 is attached to the other end of the insertion columnar portion 86 so as to prevent the insertion columnar portion 86 from falling off. The insertion member 84 is held by the lower-side reinforcing member 74 so that the insertion member 84 does not move in the up-down direction relative to the lower-side reinforcing member 74, or the insertion member 84 moves relative to the lower-side reinforcing member 74 with a slight moving amount.

The insertion holes 82 are formed in an elliptical shape elongated in the up-down direction, and a width (inside dimension) of the insertion holes 82 is slightly larger than the outside diameter of the insertion columnar portion 86.

Accordingly, lateral displacement of the insertion member 84 relative to the upper-side reinforcing member 76 is restrained.

In contrast, a height (inside dimension) of the insertion holes 82 is formed larger than its width. A first gap 28 is formed between a top wall 82U of each of the insertion holes 82 and the insertion columnar portion 86. Further, a second gap 40 is formed between a bottom wall 82L of each of the insertion holes 82 and the insertion columnar portion 86.

Figure 8B:
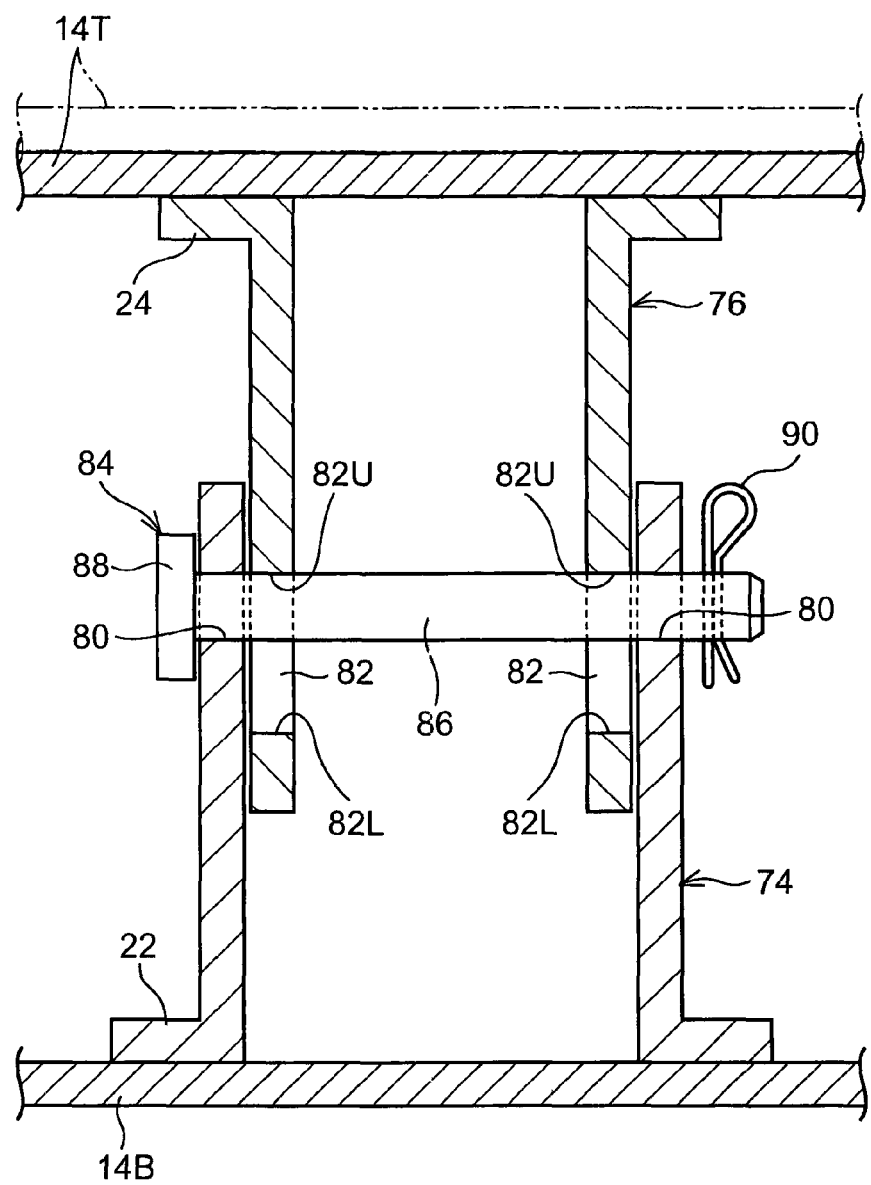
FIG. 8B is an enlarged sectional view partially illustrating the fuel tank according to the third embodiment of the present invention in a state where the fuel tank is compressively deformed.

In the third embodiment, when a tank internal pressure of the fuel-tank main body 14 becomes a negative pressure, the first gap 28 is narrowed gradually (the second gap 40 is widened) and the overlap portion 78 between the lower-side reinforcing member 74 and the upper-side reinforcing member 76 is widened. Hereby, central portions of the top wall 14T and the bottom wall 14B of the fuel-tank main body 14 are allowed to curve in a direction where the central portions come close to each other. As illustrated in FIG. 8B, when the first gap 28 between the top wall 82U of the insertion hole 82 and the insertion columnar portion 86 is eliminated and the top wall 82U comes in contact with the insertion columnar portion 86, the top wall 14T and the bottom wall 14B of the fuel-tank main body 14 are prevented from curving.

Figure 8C:
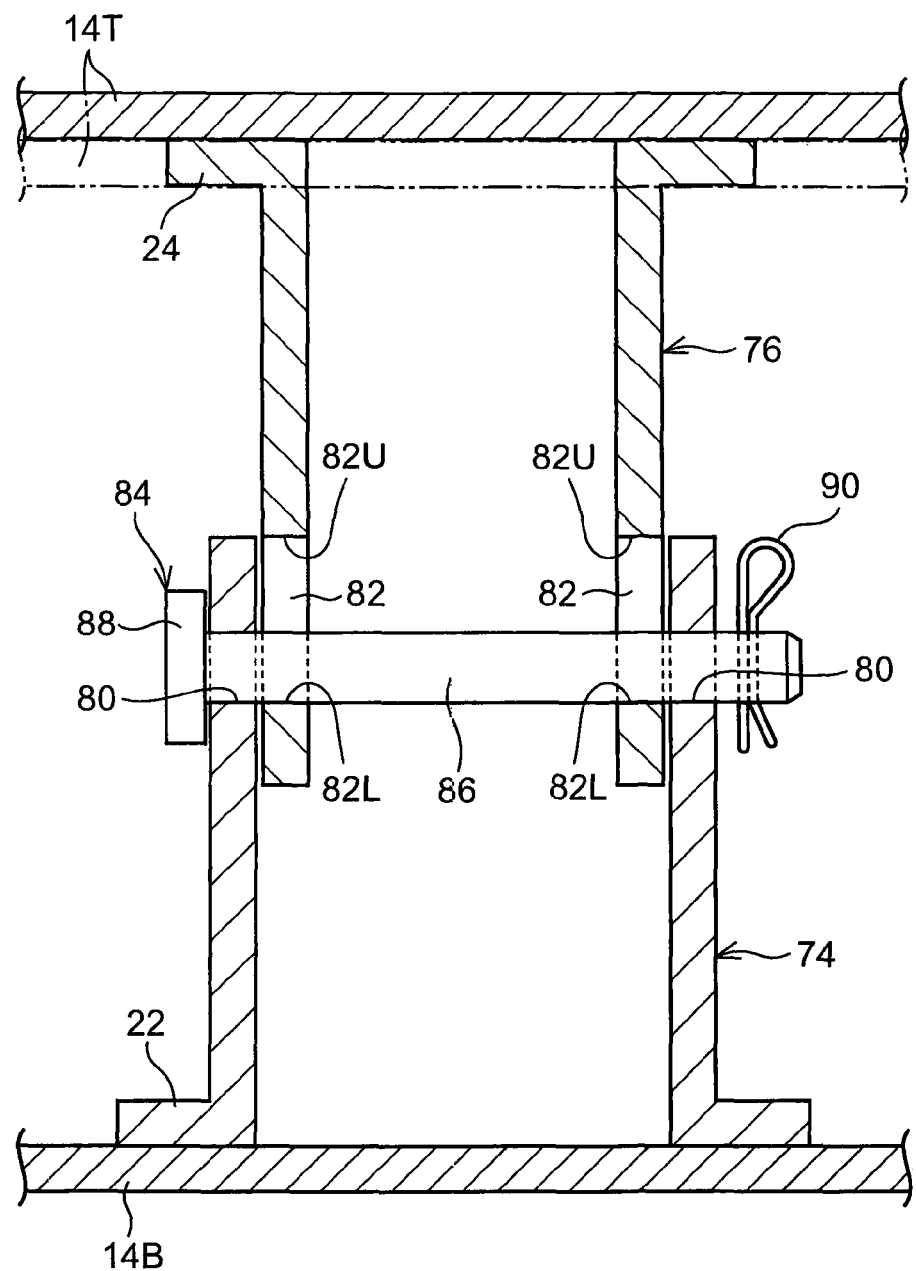
FIG. 8C is an enlarged sectional view partially illustrating the fuel tank according to the third embodiment of the present invention in a state where the fuel tank is deformed in an expanding manner.

In the third embodiment, when the tank internal pressure of the fuel-tank main body 14 becomes a positive pressure, the second gap 40 is narrowed gradually (the first gap 28 is widened) and the overlap portion 78 between the lower-side reinforcing member 74 and the upper-side reinforcing member 76 is narrowed. Hereby, the central portions of the top wall 14T and the bottom wall 14B of the fuel-tank main body 14 are allowed to curve in a direction where the central portions separate from each other. As illustrated in FIG. 8C, when the second gap 40 between the bottom wall 82L of the insertion hole 82 and the insertion columnar portion 86 is eliminated and the bottom wall 82L comes in contact with the insertion columnar portion 86, the top wall 14T and the bottom wall 14B of the fuel-tank main body 14 are prevented from curving.

That is, even in the fuel tank 72 of the third embodiment, a compressive deformation of the fuel-tank main body 14 is allowed at the time of the negative pressure of the fuel-tank main body 14, and its deformation amount is restricted to a given amount at which the first gap 28 is eliminated. Further, an expansion deformation of the fuel-tank main body 14 is allowed at the time of the positive pressure of the fuel-tank main body 14, and its deformation amount is restricted to a given amount at which the second gap 40 is eliminated.

The above description deals with a structure in which the insertion member 84 is formed separately from the lower-side reinforcing member 74 and the upper-side reinforcing member 76. However, the insertion member 84 may be integrated with the upper-side reinforcing member 76, for example. When the insertion member 84 is formed separately from the lower-side reinforcing member 74 and the upper-side reinforcing member 76, assembly thereof is easier than a structure in which they are formed integrally.

In the third embodiment, by changing a shape (the outside diameter of the insertion columnar portion 86) and a position of the insertion member 84 and a shape (height) of the insertion holes 82, it is possible to easily attain desired lengths of the first gap 28 and the second gap 40.

Next will be described a fourth embodiment of the present invention.

Figure 9:
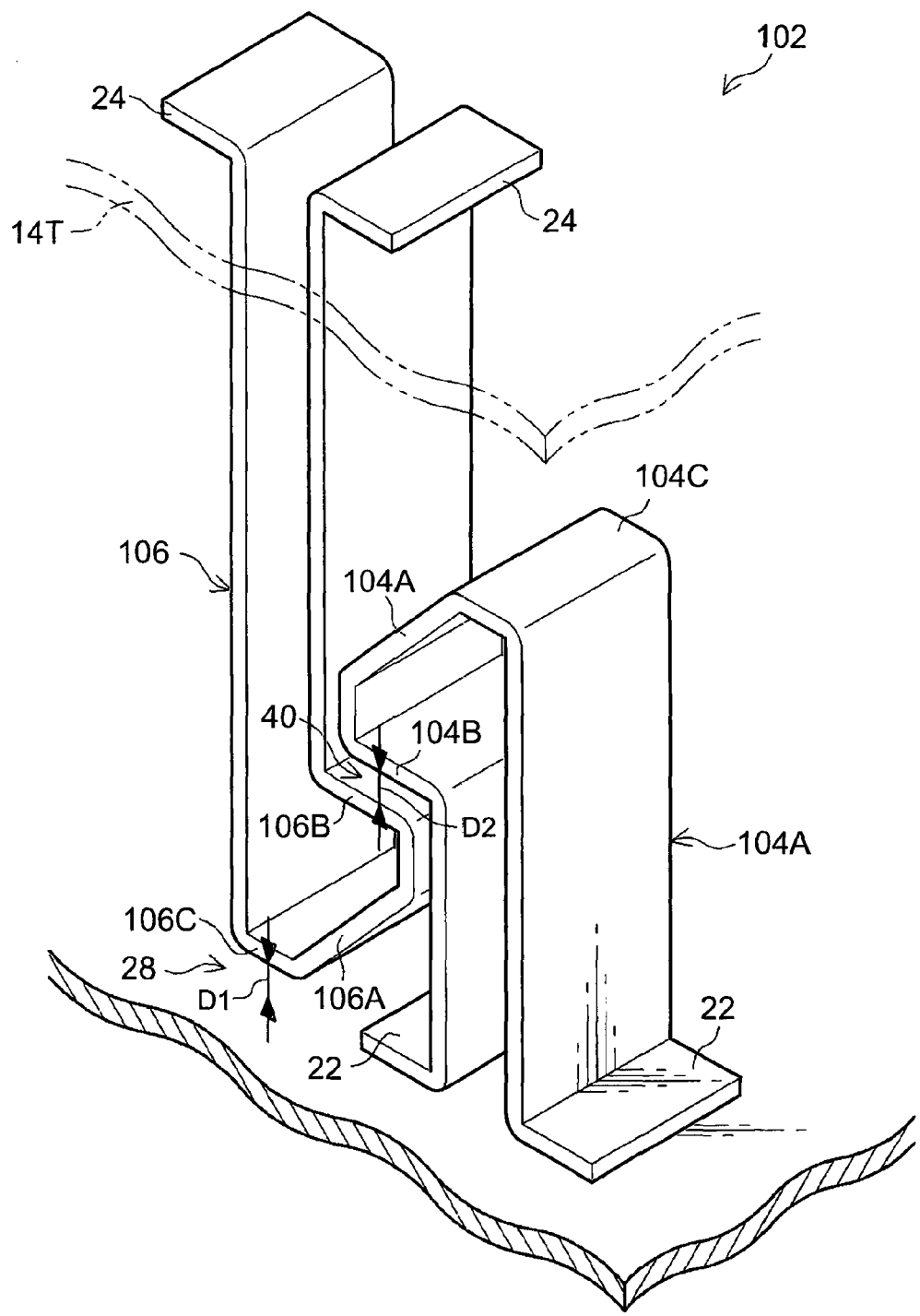
FIG. 9 is a perspective view illustrating an inside of a fuel tank according to a fourth embodiment of the present invention.

FIG. 9 illustrates a fuel tank 102 according to the fourth embodiment. Even in the fourth embodiment, the same constituent, member, or the like as in the first embodiment has the same reference sign as in the first embodiment, and a detailed description thereof is omitted. Further, a general configuration of the fuel tank in the fourth embodiment is similar to the fuel tank 12 of the first embodiment (see FIG. 1), so that the fuel tank in the fourth embodiment is not illustrated herein.

In the fourth embodiment, a lower-side reinforcing member 104 extending from a bottom wall 14B of a fuel-tank main body 14 toward a top wall 14T thereof is provided with an inclined wall 104A that is inclined diagonally upward, and a horizontal wall 104B that is provided below the inclined wall 104A in a generally horizontal manner.

On the other hand, an upper-side reinforcing member 106 extending from the top wall 14T of the fuel-tank main body 14 toward the bottom wall 14B thereof is provided with an inclined wall 106A that is inclined diagonally downward, and a horizontal wall 106B that is provided above the inclined wall 106A in a generally horizontal manner.

A lateral wall 106C of a tip end (a bottom end) of the upper-side reinforcing member 106 is opposed to the bottom wall 14B of the fuel-tank main body 14 with a predetermined distance D1, thereby forming a first gap 28. That is, in the fourth embodiment, the lateral wall 106C is an example of a gap member of the present invention.

Further, the horizontal wall 104B and the horizontal wall 106B are opposed to each other with a predetermined distance D2, thereby forming a second gap 40. The horizontal wall 104B and the horizontal wall 106B are an example of a second gap member of the present invention.

In the fourth embodiment, when the tank internal pressure of the fuel-tank main body 14 becomes a negative pressure, the first gap 28 is narrowed gradually, so that central portions of the top wall 14T and the bottom wall 14B of the fuel-tank main body 14 are allowed to curve in a direction where the central portions come close to each other. When the first gap 28 between the lateral wall 106C of the upper-side reinforcing member 106 and the bottom wall 14B of the fuel-tank main body 14 is eliminated and the lateral wall 106C comes in contact with the bottom wall 14B, the top wall 14T and the bottom wall 14B of the fuel-tank main body 14 are prevented from curving.

In the fourth embodiment, when the tank internal pressure of the fuel-tank main body 14 becomes a positive pressure, the second gap 40 is narrowed gradually, so that the central portions of the top wall 14T and the bottom wall 14B of the fuel-tank main body 14 are allowed to curve in a direction where the central portions separate from each other. When the second gap 40 between the horizontal wall 104B and the horizontal wall 106B is eliminated and the horizontal wall 104B comes in contact with the horizontal wall 106B, the top wall 14T and the bottom wall 14B of the fuel-tank main body 14 are also prevented from curving.

That is, even in the fuel tank 102 of the fourth embodiment, a compressive deformation of the fuel-tank main body 14 is allowed at the time of the negative pressure of the fuel-tank main body 14, and its deformation amount is restricted to a given amount at which the first gap 28 is eliminated. Further, an expansion deformation of the fuel-tank main body 14 is allowed at the time of the positive pressure of the fuel-tank main body 14, and its deformation amount is restricted to a given amount at which the second gap 40 is eliminated.

Note that, in the fourth embodiment, the example illustrated in FIG. 9 is configured such that the first gap 28 is formed between the lateral wall 106C of the upper-side reinforcing member 106 and the bottom wall 14B of the fuel-tank main body 14. Instead of this, the lower-side reinforcing member 104 may have such a shape that the first gap 28 is formed between the lateral wall 104C of the tip end (the upper end) of the lower-side reinforcing member 104 and the top wall 14T of the fuel-tank main body 14.

Further, depending on positions and shapes of the lower-side reinforcing member 104 and the upper-side reinforcing member 106, the first gap 28 may be formed between the lateral wall 106C and a mounting flange 22 of the lower-side reinforcing member 104.

Next will be described a fifth embodiment of the present invention.

Figure 10:
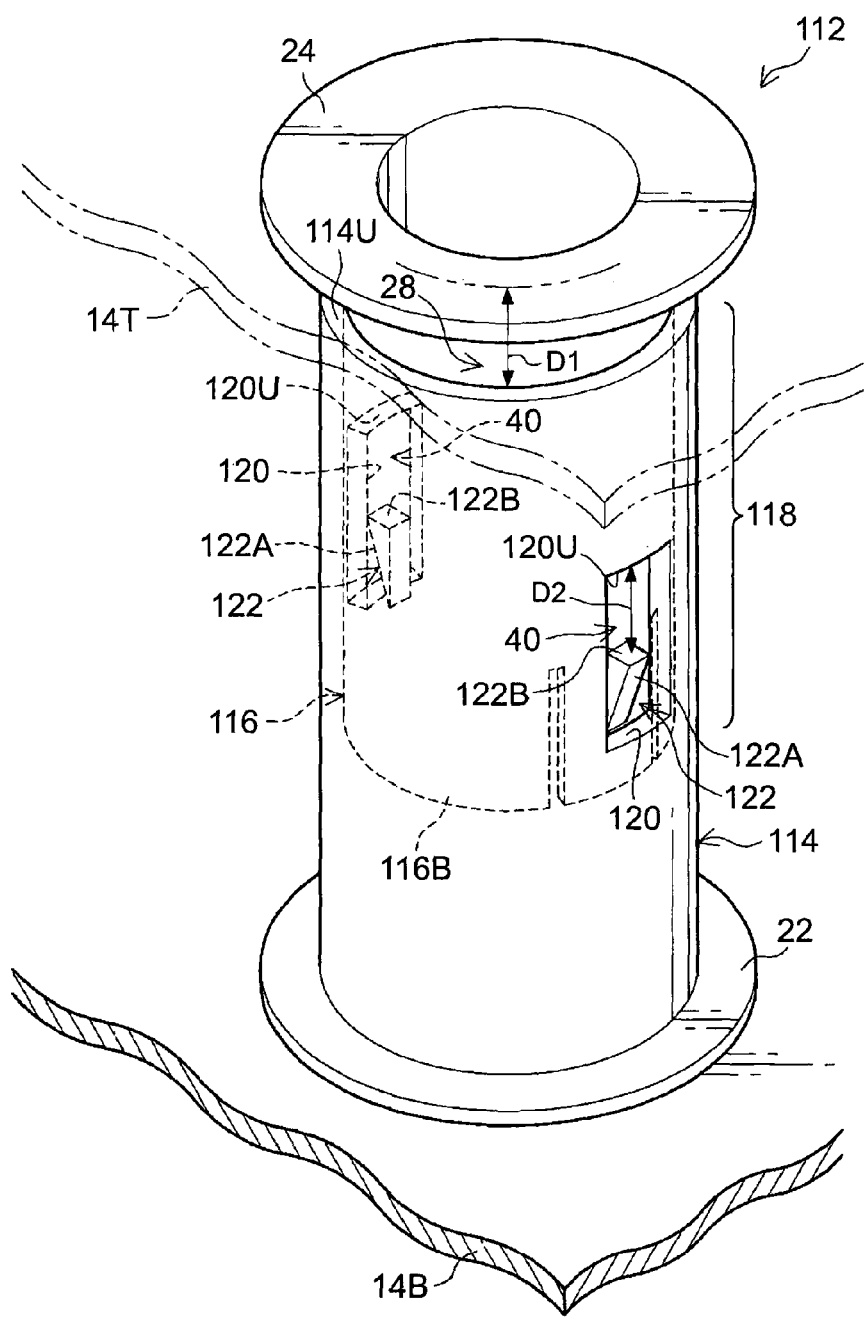
FIG. 10 is a perspective view illustrating an inside of a fuel tank according to a fifth embodiment of the present invention.

FIG. 10 illustrates a fuel tank 112 according to the fifth embodiment. Even in the fifth embodiment, the same constituent, member, or the like as in the first embodiment has the same reference sign as in the first embodiment, and a detailed description thereof is omitted. Further, a general configuration of the fuel tank in the fifth embodiment is similar to the fuel tank 12 of the first embodiment (see FIG. 1), so that the fuel tank in the fourth embodiment is not illustrated herein.

In the fifth embodiment, a lower-side reinforcing member 114 extends from a bottom wall 14B of a fuel-tank main body 14 toward a top wall 14T thereof, and an upper-side reinforcing member 116 extends from the top wall 14T toward the bottom wall 14B. When viewed from a lateral direction, an overlap portion 118 is formed between the lower-side reinforcing member 114 and the upper-side reinforcing member 116.

In the example illustrated in FIG. 10, the lower-side reinforcing member 114 and the upper-side reinforcing member 116 have a cylindrical shape, and the upper-side reinforcing member 116 is placed inside the lower-side reinforcing member 114. Alternatively, the lower-side reinforcing member 114 may be placed inside the upper-side reinforcing member 116. Further, at least one of the lower-side reinforcing member 114 and the upper-side reinforcing member 116 may be formed in a plate-like shape.

A tip end (an upper edge 114U) of the lower-side reinforcing member 114 is opposed to the top wall 14T of the fuel-tank main body 14 or a mounting flange 24 with a predetermined distance D1, thereby forming a first gap 28.

In the overlap portion 118, a receiving hole 120 is formed in either one of the lower-side reinforcing member 114 and the upper-side reinforcing member 116 (the lower-side reinforcing member 114, in the example of FIG. 10). A receiving claw 122 to be received in the receiving hole 120 is formed in the other one of the lower-side reinforcing member 114 and the upper-side reinforcing member 116 (the upper-side reinforcing member 116, in the example of FIG. 10).

The receiving claw 122 includes an inclined surface 122A that is inclined diagonally toward the bottom wall 14B of the fuel-tank main body 14, and an opposed surface 122B that is generally parallel to the top wall 14T of the fuel-tank main body 14. A second gap 40 is formed between the opposed surface 122B and an upper edge 120U of the receiving hole 120.

Note that, in the example illustrated herein, the upper-side reinforcing member 116 includes bending slits 124 provided on both sides of the receiving claw 122 so as to form a bending portion 126 around an area where the receiving claw 122 is formed. Further, the inclined surface 122A is formed in the receiving claw 122. When the upper-side reinforcing member 116 is inserted into the lower-side reinforcing member 114, the inclined surface 122A comes in contact with the lower-side reinforcing member 114, so that the bending portion 126 is bent. Hereby, the insertion thereof is performed easily. When the receiving claw 122 reaches the receiving hole 120, the bending portion 126 is restored to its original state, and the second gap 40 is formed.

In the fifth embodiment, when a tank internal pressure of the fuel-tank main body 14 becomes a negative pressure, the first gap 28 is narrowed gradually, so that central portions of the top wall 14T and the bottom wall 14B of the fuel-tank main body 14 are allowed to curve in a direction where the central portions come close to each other. When the first gap 28 between the upper edge 114U of the lower-side reinforcing member 114 and the top wall 14T of the fuel-tank main body 14 or the mounting flange 24 is eliminated and the upper edge 114U of the lower-side reinforcing member 114 comes in contact with the top wall 14T of the fuel-tank main body 14 or the mounting flange 24, the top wall 14T and the bottom wall 14B of the fuel-tank main body 14 are prevented from curving.

In the fifth embodiment, when the tank internal pressure of the fuel-tank main body 14 becomes a positive pressure, the second gap 40 is narrowed gradually, so that the central portions of the top wall 14T and the bottom wall 14B of the fuel-tank main body 14 are allowed to curve in a direction where the central portions separate from each other. When the second gap 40 between the opposed surface 122B of the receiving claw 122 and the upper edge 120U of the receiving hole 120 is eliminated and the opposed surface 122B comes in contact with the upper edge 120U, the top wall 14T and the bottom wall 14B of the fuel-tank main body 14 are prevented from curving.

That is, even in the fuel tank 112 of the fifth embodiment, a compressive deformation of the fuel-tank main body 14 is allowed at the time of the negative pressure of the fuel-tank main body 14, and its deformation amount is restricted to a given amount at which the first gap 28 is eliminated. Further, an expansion deformation of the fuel-tank main body 14 is allowed at the time of the positive pressure of the fuel-tank main body 14, and its deformation amount is restricted to a given amount at which the second gap 40 is eliminated.

Note that, in the fifth embodiment, the example illustrated in FIG. 10 is configured such that the first gap 28 is formed between the upper edge 114U of the lower-side reinforcing member 114 and the top wall 14T of the fuel-tank main body 14. Instead of this, the first gap 28 may be formed between a bottom edge 116B on a tip end (a bottom end) of the upper-side reinforcing member 116 and the bottom wall 14B of the fuel-tank main body 14.

Further, depending on shapes and positions of the lower-side reinforcing member 114 and the upper-side reinforcing member 116, the first gap 28 may be formed between the upper edge 114U of the lower-side reinforcing member 114 and the mounting flange 24 of the upper-side reinforcing member 116.

Each of the above embodiments deals with an example in which one lower-side reinforcing member and one upper-side reinforcing member are provided as the structural member of the present invention, but a structure constituting the first gap 28 and the second gap 40 is not limited to the above. For example, another extension member may be further added, so that either one of the first gap 28 and the second gap 40 may be constituted by the another extension member thus added.

Figure 11:
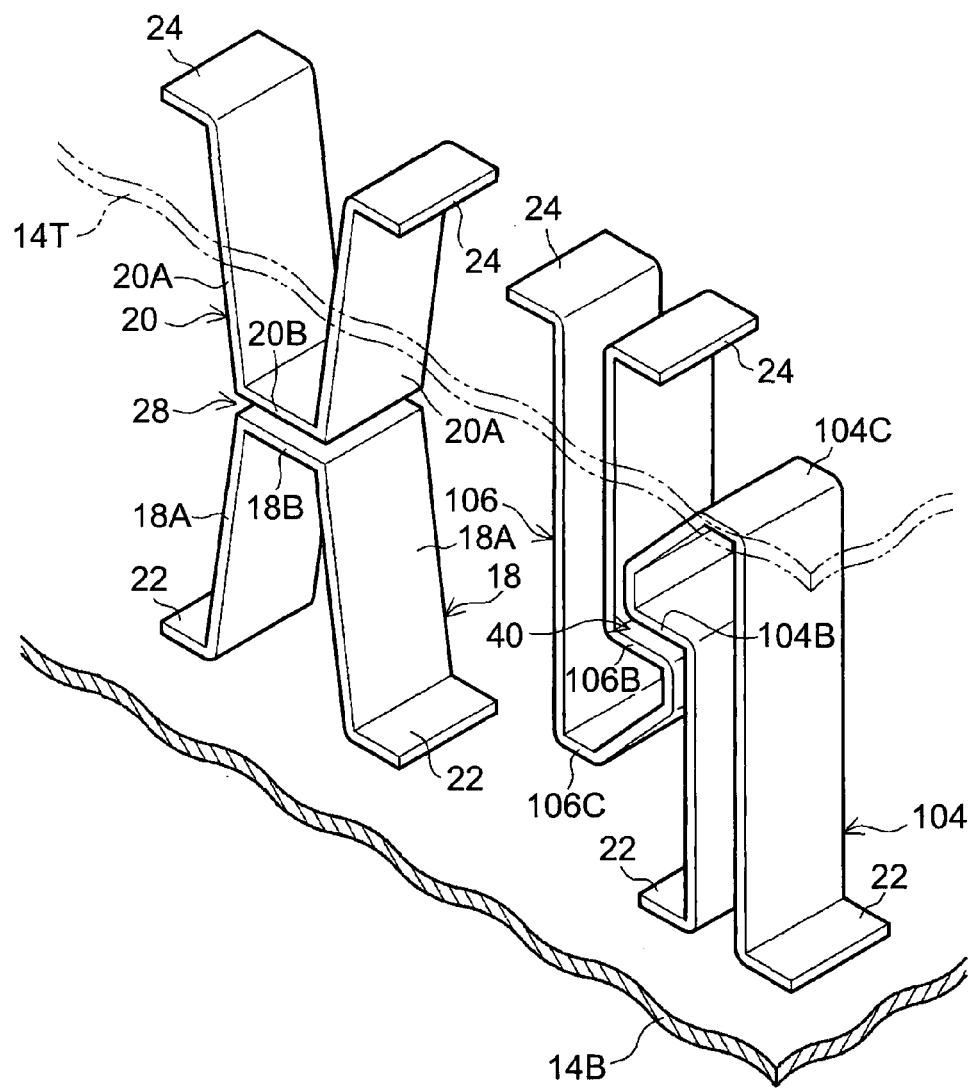
FIG. 11 is a perspective view illustrating an inside of a fuel tank according to a modification of the fourth embodiment of the present invention.

As an example, in a modification of the fourth embodiment illustrated in FIG. 11, a second gap 40 is formed between a horizontal wall 104B of a lower-side reinforcing member 104 and a horizontal wall 106B of an upper-side reinforcing member 106.

However, a lateral wall 104C of the lower-side reinforcing member 104 is placed in a position largely distanced from a top wall 14T of a fuel-tank main body 14, and no first gap 28 is formed therebetween. Similarly, a lateral wall 106C of the upper-side reinforcing member 106 is placed in a position largely distanced from a bottom wall 14B of the fuel-tank main body 14, and no first gap 28 is formed therebetween.

In the modification of the fourth embodiment, another lower-side reinforcing member 18 is extended from the bottom wall 14B of the fuel-tank main body 14 toward the top wall 14T thereof, and another upper-side reinforcing member 20 is extended from the top wall 14T toward the bottom wall 14B. A first gap 28 is formed between a lateral wall 18B of the lower-side reinforcing member 18 and a lateral wall 20B of the upper-side reinforcing member 20.

Thus, two lower-side reinforcing member 18, 104 and two upper-side reinforcing member 20, 106 may be provided as the structural member of the present invention, so as to from the first gap 28 and the second gap 40.

Note that, in the modification of the fourth embodiment, the upper-side reinforcing member 20 may not be provided, and the lower-side reinforcing member 18 may be extended upward so that the first gap 28 is formed between the lower-side reinforcing member 18 thus extended and the top wall 14T of the fuel-tank main body 14. Alternatively, the lower-side reinforcing member 18 may not be provided, and the upper-side reinforcing member 20 may be extended downward so that the first gap 28 is formed between the upper-side reinforcing member 20 thus extended and the bottom wall 14B of the fuel-tank main body 14.

Next will be described a sixth embodiment of the present invention.

Figure 12:
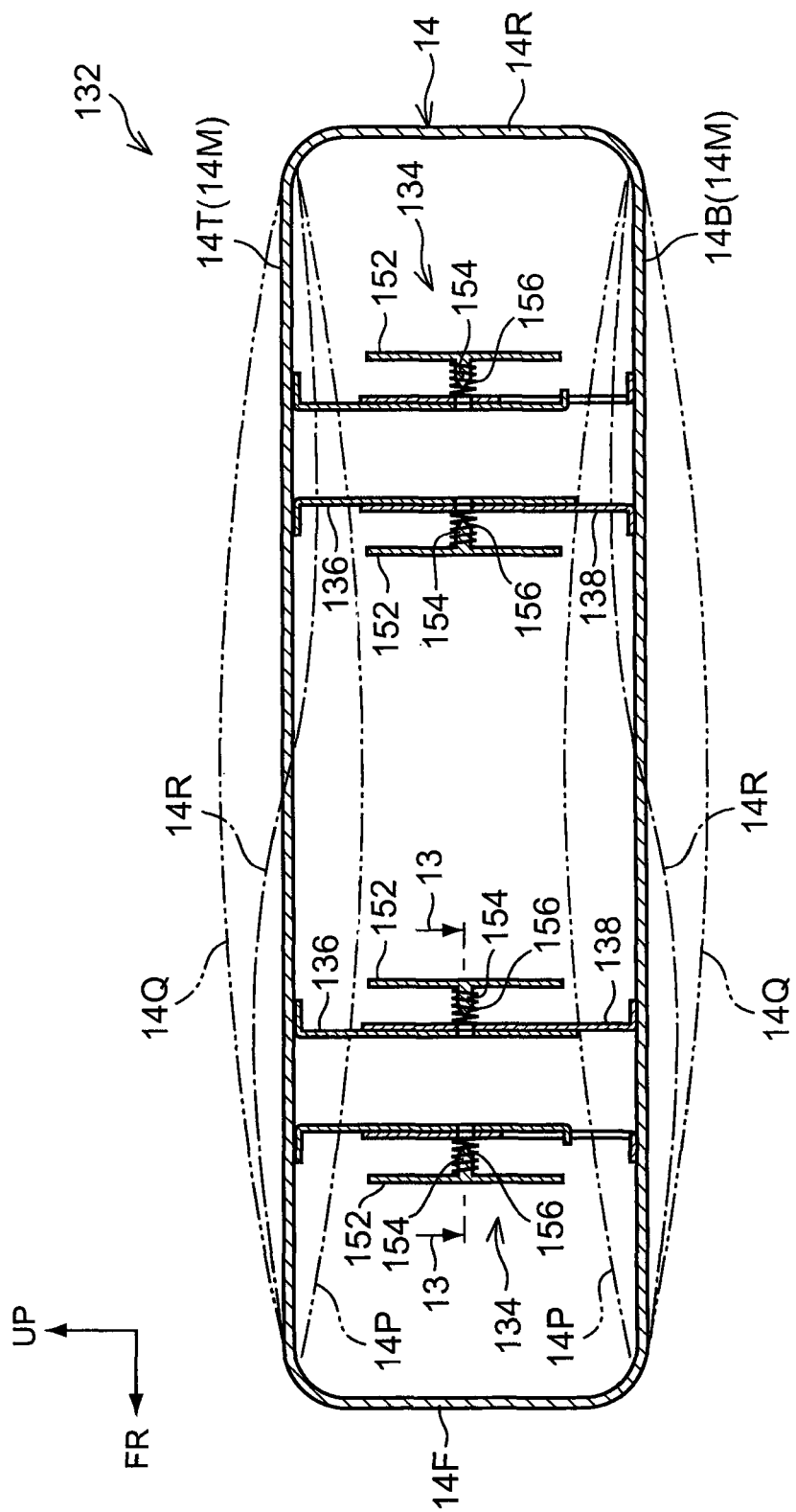
FIG. 12 is a drawing of a longitudinal section illustrating a fuel tank according to a sixth embodiment of the present invention.

FIG. 12 illustrates a fuel tank 132 according to the sixth embodiment. Even in the sixth embodiment, the same constituent, member, or the like as in the first embodiment has the same reference sign as in the first embodiment, and a detailed description thereof is omitted.

In the sixth embodiment, as can be seen from FIG. 12, structural members 134 are provided in two offset parts on a front side and on a rear side relative to a center of a fuel-tank main body 14 in the vehicle front-rear direction, for example.

Figure 13:
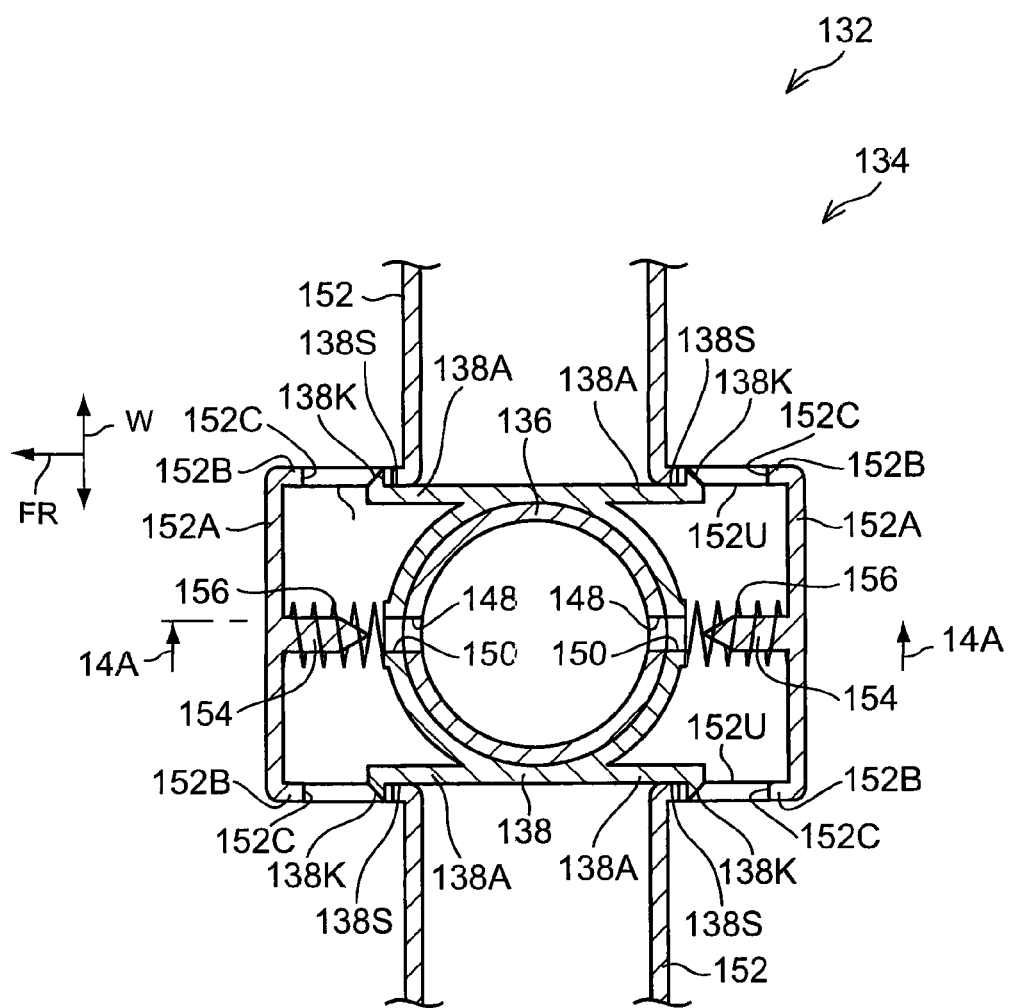
FIG. 13 is a sectional view taken along a line 13-13 in FIG. 12 that illustrates the fuel tank according to the sixth embodiment of the present invention.
Figure 14B:
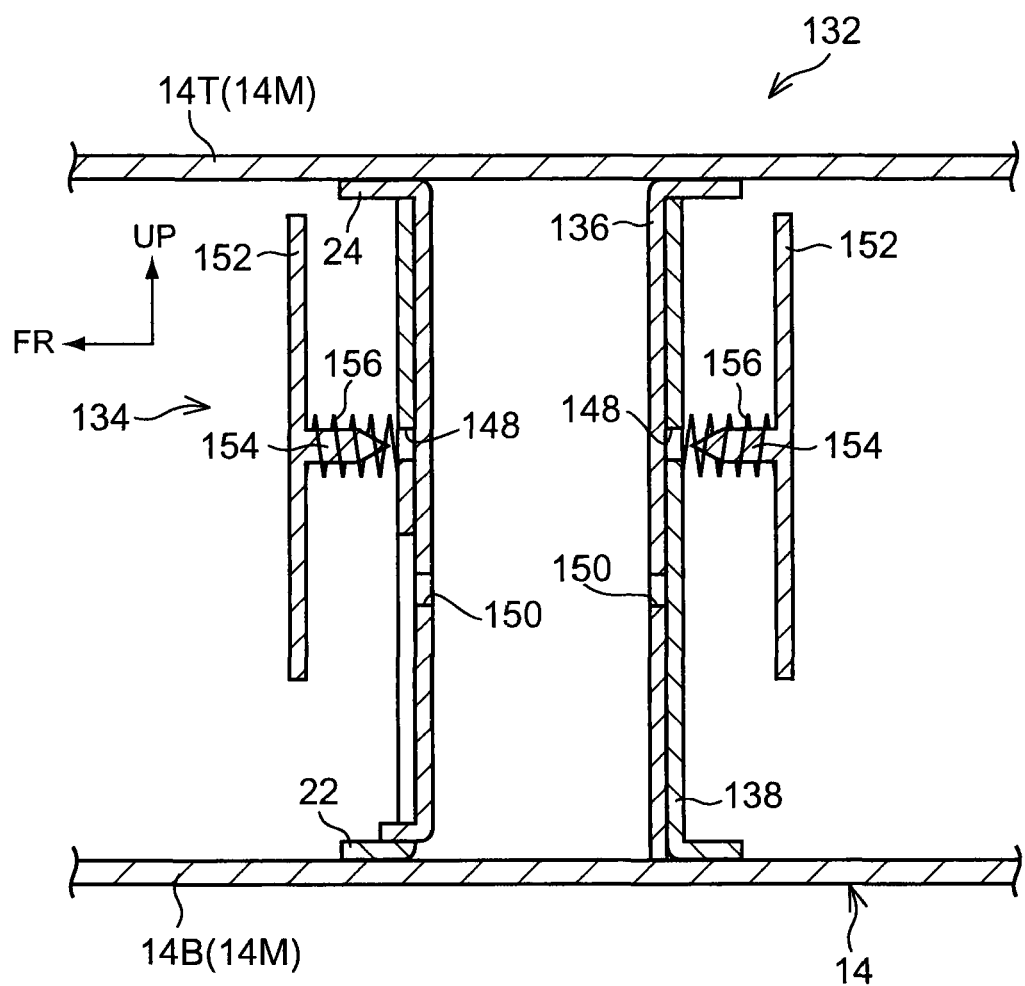
FIG. 14B is an enlarged sectional view partially illustrating the fuel tank according to the sixth embodiment of the present invention in a state where the fuel tank is compressively deformed.
Figure 14C:
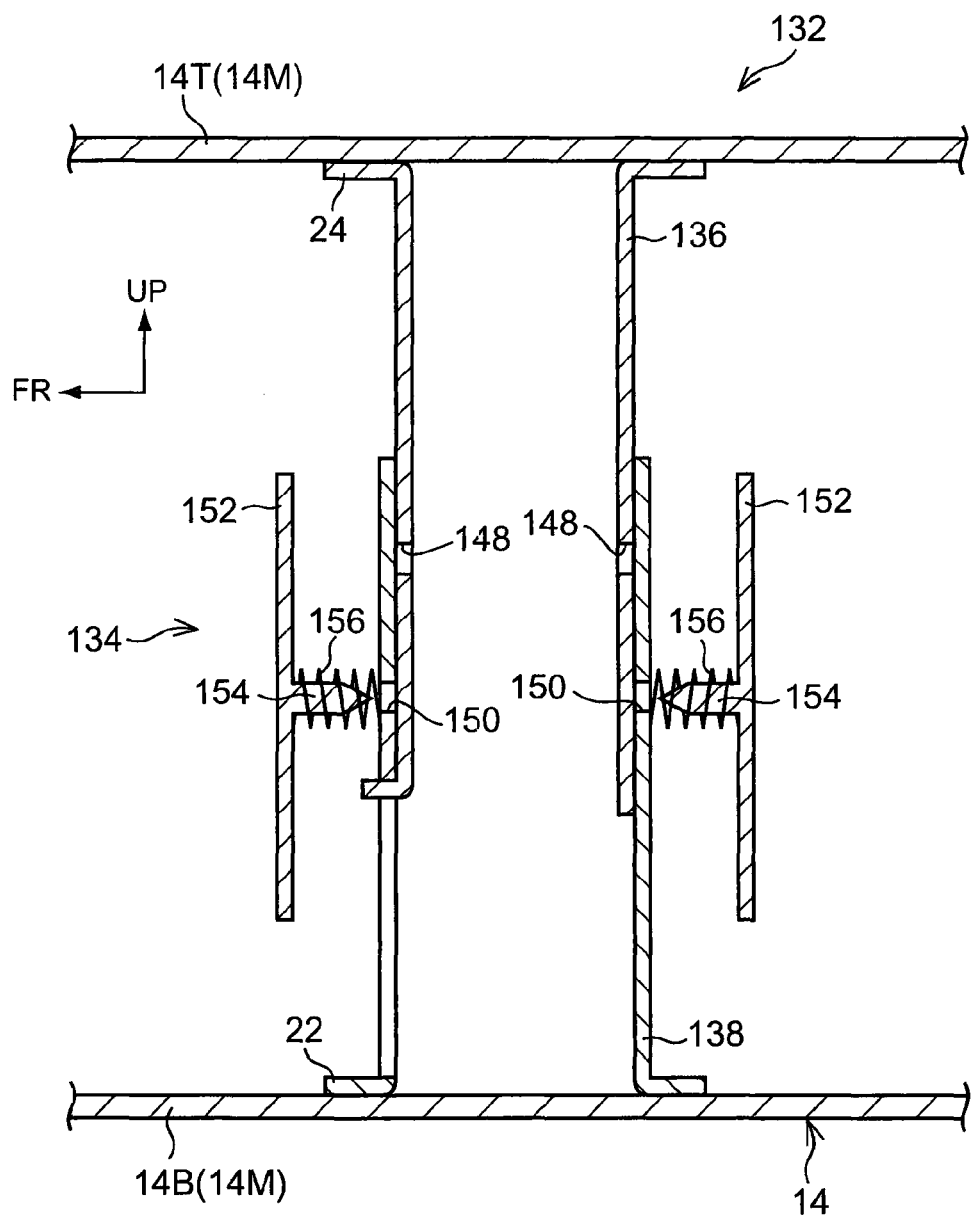
FIG. 14C is an enlarged sectional view partially illustrating the fuel tank according to the sixth embodiment of the present invention in a state where the fuel tank is deformed in an expanding manner.
Figure 14D:
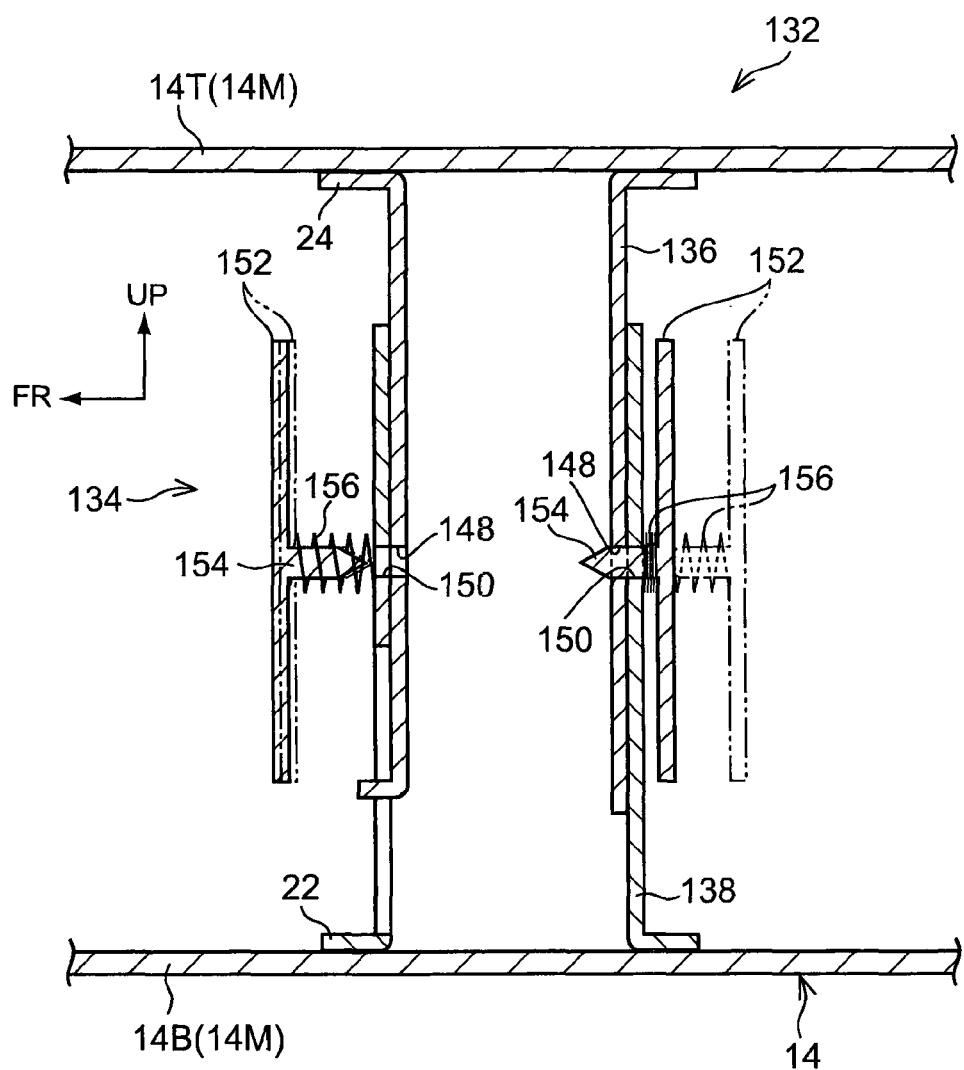
FIG. 14D is an enlarged sectional view partially illustrating the fuel tank according to the sixth embodiment of the present invention in a state where fuel moves in the fuel tank.

As specifically illustrated in FIGS. 13 to 14D, the structural members 134 of the sixth embodiment each include an upper-side tubular member 136 and a lower-side tubular member 138. The upper-side tubular member 136 is attached to a top wall 14T of the fuel-tank main body 14 via a mounting flange 24. The upper-side tubular member 136 is extended toward a bottom wall 14B.

A first gap 28 is formed between a bottom end 136B of the upper-side tubular member 136 and the bottom wall 14B of the fuel-tank main body 14.

Further, the lower-side tubular member 138 is attached to the bottom wall 14B of the fuel-tank main body 14 via a mounting flange 22. The lower-side tubular member 138 is extended toward the top wall 14T. In the present embodiment, the lower-side tubular member 138 has a diameter larger than that of the upper-side tubular member 136, and is placed outside the upper-side tubular member 136. Note that the lower-side tubular member 138 may have a diameter smaller than that of the upper-side tubular member 136, so as to be placed inside the upper-side tubular member 136. The upper-side tubular member 136 and the lower-side tubular member 138 include overlap portions 140, 142 that overlap with each other in a horizontal direction (a direction perpendicular to a direction where opposing walls 14M are opposed to each other).

A receiving hole 144 is formed in the lower-side tubular member 138 so as to penetrate through the lower-side tubular member 138 in the horizontal direction. A moving piece 146 received in the receiving hole 144 is formed in the upper-side tubular member 136. A second gap 40 is formed between an upper end 146A of the moving piece 146 and a top face 144A of the receiving hole 144.

Through holes 148, 150 are formed in the upper-side tubular member 136 and the lower-side tubular member 138 so as to penetrate therethrough in the horizontal direction. As illustrated by a continuous line in FIG. 12, when viewed in the horizontal direction, the through holes 148, 150 align with each other in a state where attachment portions of the structural member 134 with respect to the top wall 14T and the bottom wall 14B of the fuel-tank main body 14 do not come close to each other or separate from each other.

Opposed members 152 are placed on a vehicle front side and on a vehicle rear side relative to the lower-side tubular member 138. As illustrated in FIG. 13, the opposed member 152 includes, in a center thereof in a width direction, a separation portion 152A that is bent in a direction where the opposed member 152 separates from the lower-side tubular member 138. In the separation portion 152A, an insertion pin 154 insertable into the through holes 148, 150 is provided in a projecting manner.

Two sliding pieces 138A for each opposed member 152, that is, four sliding pieces 138A in total are extended from the lower-side tubular member 138. An outer surface 138S of each of the sliding pieces 138A comes in contact with an inner surface 152U of a lateral wall 152B of its corresponding opposed member 152 or faces the inner surface 152U with a small gap therebetween. Hereby, the opposed member 152 is restrained from moving in the vehicle width direction relative to the lower-side tubular member 138, but is allowed to move in the vehicle front-rear direction.

A hook piece 138K is formed in an extending tip of the sliding piece 138A. The hook piece 138K is received in a receiving hole 152C formed on the lateral wall 152B of the opposed member 152. This prevents the opposed member 152 from excessively separating from the lower-side tubular member 138 in the vehicle front-rear direction. Further, the opposed member 152 is held in a predetermined position relative to the lower-side tubular member 138 in the front-rear direction.

A spring member 156 is placed between the lower-side tubular member 138 and the opposed member 152. The spring member 156 is wound around the insertion pin 154 in the example illustrated in FIG. 13. The spring member 156 applies a predetermined spring force in a direction where the opposed member 152 is separated from the lower-side tubular member 138. Accordingly, in a normal state, the insertion pin 154 is not inserted into the through holes 148, 150. However, when the opposed member 152 comes close to the lower-side tubular member 138 against the spring force of the spring member 156 due to fuel that flows in the fuel-tank main body 14, the insertion pin 154 is inserted into the through holes 148, 150 as illustrated in FIG. 14D. When the insertion pin 154 is inserted into the through holes 148, 150, the lower-side tubular member 138 and the upper-side tubular member 136 are restrained from moving relative to each other in the up-down direction.

In the fuel tank 132 of the sixth embodiment thus configured, when a tank internal pressure of the fuel-tank main body 14 becomes a negative pressure in a state where the insertion pin 154 is not inserted into the through holes 148, 150, the first gap 28 is narrowed gradually, so that the top wall 14T and the bottom wall 14B of the fuel-tank main body 14 are allowed to curve in a direction where the top wall 14T and the bottom wall 14B come close to each other. When the first gap 28 between a bottom end 136B of the upper-side tubular member 136 and the bottom wall 14B of the fuel-tank main body 14 is eliminated and the bottom end 136B comes in contact with the bottom wall 14B, the top wall 14T and the bottom wall 14B of the fuel-tank main body 14 are prevented from curving.

In the sixth embodiment, when the tank internal pressure of the fuel-tank main body 14 becomes a positive pressure in a state where the insertion pin 154 is not inserted into the through holes 148, 150, the second gap 40 is narrowed gradually, so that the top wall 14T and the bottom wall 14B of the fuel-tank main body 14 are allowed to curve in a direction where the top wall 14T and the bottom wall 14B separate from each other. As illustrated in FIG. 14C, when the second gap 40 between the upper end 146A of the moving piece 146 and the top face 144A of the receiving hole 144 is eliminated and the upper end 146A comes in contact with the top face 144A, the top wall 14T and the bottom wall 14B of the fuel-tank main body 14 are prevented from curving.

That is, even in the fuel tank 132 of the sixth embodiment, a compressive deformation of the fuel-tank main body 14 is allowed at the time of the negative pressure of the fuel-tank main body 14, and its deformation amount is restricted to a given amount at which the first gap 28 is eliminated. Further, an expansion deformation of the fuel-tank main body 14 is allowed at the time of the positive pressure of the fuel-tank main body 14, and its deformation amount is restricted to a given amount at which the second gap 40 is eliminated.

Further, in the fuel tank 132 of the sixth embodiment, when the opposed member 152 receives a force of fuel flow in the fuel-tank main body 14, the opposed member 152 comes close to the lower-side tubular member 138 against the spring force of the spring member 156, and the insertion pin 154 is inserted into the through holes 148, 150. When the insertion pin 154 is inserted into the through holes 148, 150 as such, the lower-side tubular member 138 and the upper-side tubular member 136 are restrained from moving relative to each other in the up-down direction, so that deformations of the top wall 14T and the bottom wall 14B of the fuel-tank main body 14 are also restrained.

For example, when the fuel in the fuel-tank main body 14 moves toward the vehicle front side, a front portion of the fuel-tank main body 14 may curve in the direction where the top wall 14T and the bottom wall 14B separate from each other, and a rear portion thereof may curve in the direction where the top wall 14T and the bottom wall 14B come close to each other, as illustrated in an alternate long and short dash line 14R in FIG. 12. In the sixth embodiment, when the insertion pin 154 is inserted into the through holes 148, 150 due to such fuel flow, the deformations of the top wall 14T and the bottom wall 14B of the fuel-tank main body 14 can be restrained.

As is apparent from the above description, estimated deformation amounts of the top wall 14T and the bottom wall 14B along with the fuel flow in the fuel-tank main body 14 are small in a center of the fuel-tank main body 14 (the center thereof in the vehicle front-rear direction, in the example of FIG. 12). Accordingly, from the viewpoint of restraining the deformations of the top wall 14T and the bottom wall 14B along with the fuel flow in the fuel-tank main body 14, it is preferable to place the structural members 134 in positions except the center of the fuel-tank main body 14 (in positions where the estimated deformation amounts are large). However, if the structural members 134 are placed in positions that are too close to a front wall 14F and a rear wall 14R, the estimated deformation amounts of the top wall 14T and the bottom wall 14B decrease not only at the time when the fuel flows but also at the time of the positive pressure and the negative pressure. In view of this, it is preferable that the structural members 134 be placed in positions distanced from the front wall 14F and the rear wall 14R.

Further, the positions where the structural members 134 are placed in an offset manner are not limited to the front side and the rear side of the fuel-tank main body 14 in the vehicle front-rear direction, and may be a right side and a left side thereof in the width direction. However, in consideration that the direction of the fuel flow in the fuel-tank main body 14 often depends on acceleration in the vehicle front-rear direction, it is preferable that the structural members 134 be placed at least on the front side and the rear side in the vehicle front-rear direction.

Particularly, in the above example, the opposed members 152 are placed on the vehicle front side and on the vehicle rear side of the lower-side tubular member 138. Accordingly, it is possible to restrain the deformations of the top wall 14T and the bottom wall 14B against fuel flow toward the vehicle rear side and against fuel flow toward the vehicle front side.

Note that the above description deals with a case where the upper-side tubular member 136 and the lower-side tubular member 138 are provided as the first extension member and the second extension member, but it is not necessary for the first extension member and the second extension member to be formed in a tubular shape, and they may be formed as plate-shaped members. When the first extension member and the second extension member are formed in a tubular shape as depicted above, the overlap portions 142, 144 can be formed over whole circumferences of the tubular members. Further, the through holes 148, 150 can be formed in several different parts in the overlap portions 142, 144 in a circumferential direction.

Besides, in a case where the first extension member and the second extension member are formed as the tubular members, the rigidity in the up-down direction increases in comparison with flat-plate members.

The above description deals with an example in which the overlap portions 140, 142 are formed in the upper-side tubular member 136 and the lower-side tubular member 138, and the through holes 148, 150 as a first engaging member and a second engaging member are formed in the overlap portions. However, even in a case of a structure not provided with the overlap portions, when two engaged portions provided in the opposed members are engaged with respective engaging members of the upper-side tubular member 136 and the lower-side tubular member 138, it is possible to restrain relative movement between the upper-side tubular member 136 and the lower-side tubular member 138. When the insertion pin 154 is inserted into the through hole 148, 150 as described above, it is possible to highly surely restrain the relative movement between the upper-side tubular member 136 and the lower-side tubular member 138.

Next will be described a seventh embodiment of the present invention.

Figure 15:
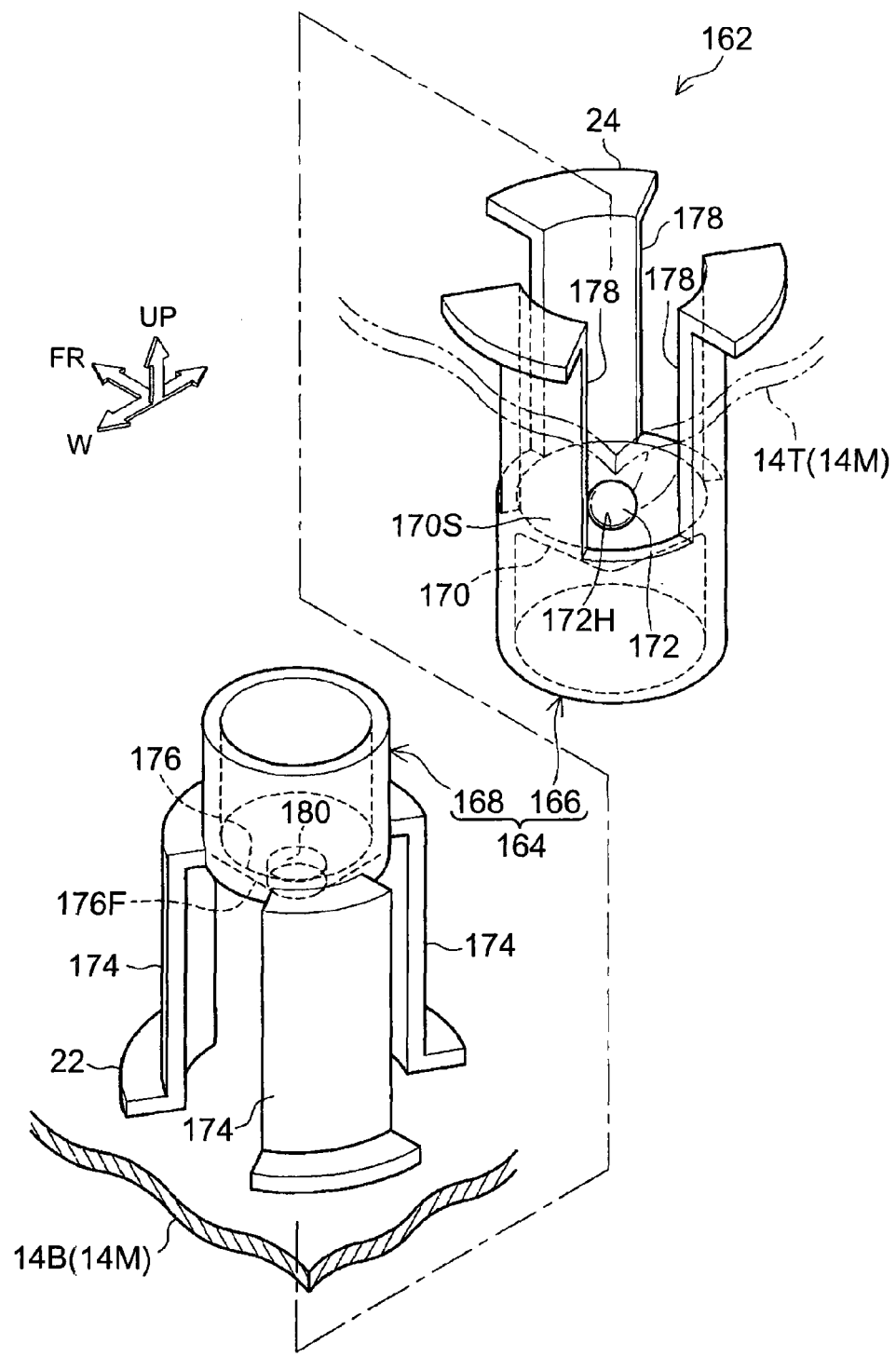
FIG. 15 is a perspective view illustrating an inside of a fuel tank according to a seventh embodiment of the present invention.

FIGS. 15 to 16C partially illustrate a fuel tank 162 of the seventh embodiment in an enlarged manner. In the seventh embodiment, the same constituent, member, or the like has the same reference sign as in the first embodiment, and a detailed description thereof is omitted. In the seventh embodiment, a position of a structural member can be placed in the same position as in the fuel tank 132 (see FIG. 12) of the sixth embodiment.

A structural member 164 of the seventh embodiment includes an upper-side tubular member 166 and a lower-side tubular member 168. The upper-side tubular member 166 is attached to a top wall 14T of a fuel-tank main body 14 via a mounting flange 24. The upper-side tubular member 166 is extended toward a bottom wall 14B, and a first gap 28 is formed between a bottom end 166B of the upper-side tubular member 166 and the bottom wall 14B of the fuel-tank main body 14.

An inclined member 170 is provided in an intermediate position of the upper-side tubular member 166 in the up-down direction. The inclined member 170 includes an inclined surface 170S that is gradually inclined downward toward a center of the upper-side tubular member 166 (in other words, it is inclined upward in a whole outer circumference in a radial direction). A center of the inclined surface 170S is a recessed portion 170H where a moving ball 172 (described below) is placed in a normal state.

The lower-side tubular member 168 is attached to the bottom wall 14B of the fuel-tank main body 14 via mounting legs 174. An opposed member 176 is provided in a lower portion of the lower-side tubular member 168. A bottom face of the opposed member 176 is considered as an opposed surface 176F.

A plurality of mounting legs 174 is formed at given intervals in a circumferential direction of the lower-side tubular member 168 (three mounting legs 174 are provided in the example illustrated in FIG. 15). In the meantime, notches 178 are formed in the upper-side tubular member 166 in positions corresponding to the mounting legs 174. The mounting legs 174 are fitted to the notches 178 so that the opposed member 176 is placed on the inclined member 170 (see FIG. 16A). Here, the opposed surface 176F is opposed to the inclined surface 170S via a second gap 40. Accordingly, in a section as shown in FIG. 16A, the inclined surface 170S and the opposed surface 176F are parallel to each other.

The moving ball 172 as the moving member is supported by the inclined surface 170S. A diameter of the moving ball 172 is slightly smaller than that distance D3 of a second gap 40 which is measured along a normal line direction of the inclined surface 170S in FIG. 16A.

A tolerance hole 180 having a diameter larger than that of the moving ball 172 is formed in a center of the opposed member 176 (above the recessed portion 170H). In a state where the moving ball 172 is placed in the recessed portion 170H, the tolerance hole 180 is placed above the moving ball 172, so that the inclined member 170 and the opposed member 176 are allowed to relatively come close to each other as illustrated in FIG. 16C.

Figure 16A:
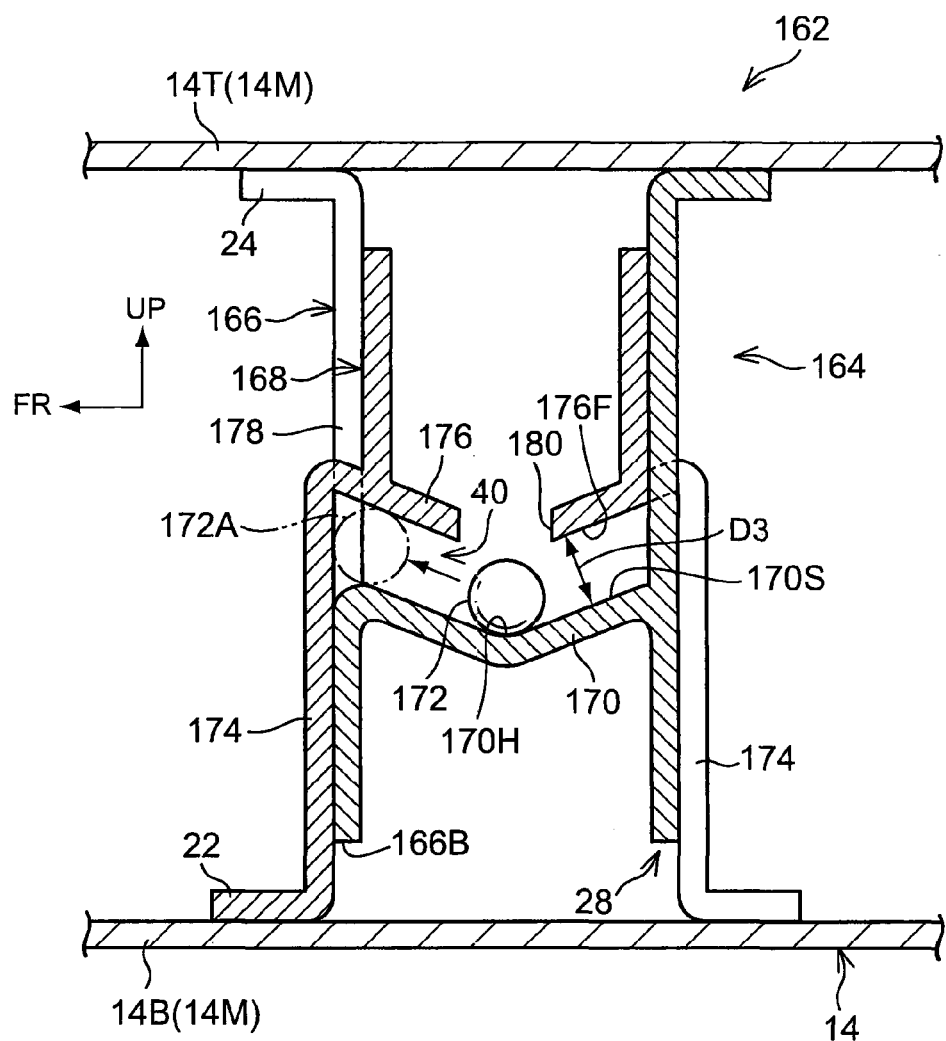
FIG. 16A is an enlarged sectional view partially illustrating the fuel tank according to the seventh embodiment of the present invention in a state where the fuel tank is not deformed.

On the other hand, the moving ball 172 may move upward on the inclined surface 170S so as to be placed between the inclined surface 170S and the opposed surface 176F (the second gap 40) as illustrated in an alternate long and two short dashes line 172A in FIG. 16A. In this state, even if the inclined member 170 and the opposed member 176 are relatively coming close to each other, the moving ball 172A is sandwiched between the inclined member 170 and the opposed member 176, so that their movement to come close to each other is limited.

Figure 16B:
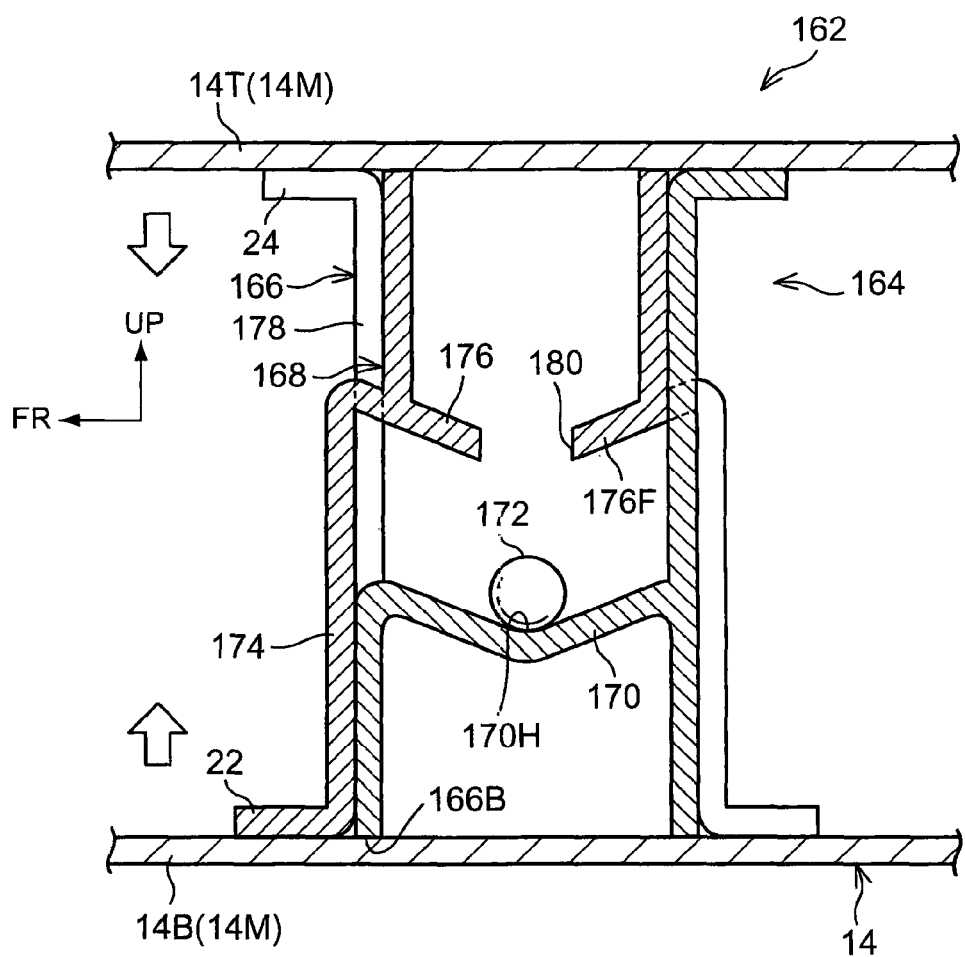
FIG. 16B is an enlarged sectional view partially illustrating the fuel tank according to the seventh embodiment of the present invention in a state where the fuel tank is compressively deformed.
Figure 18A:
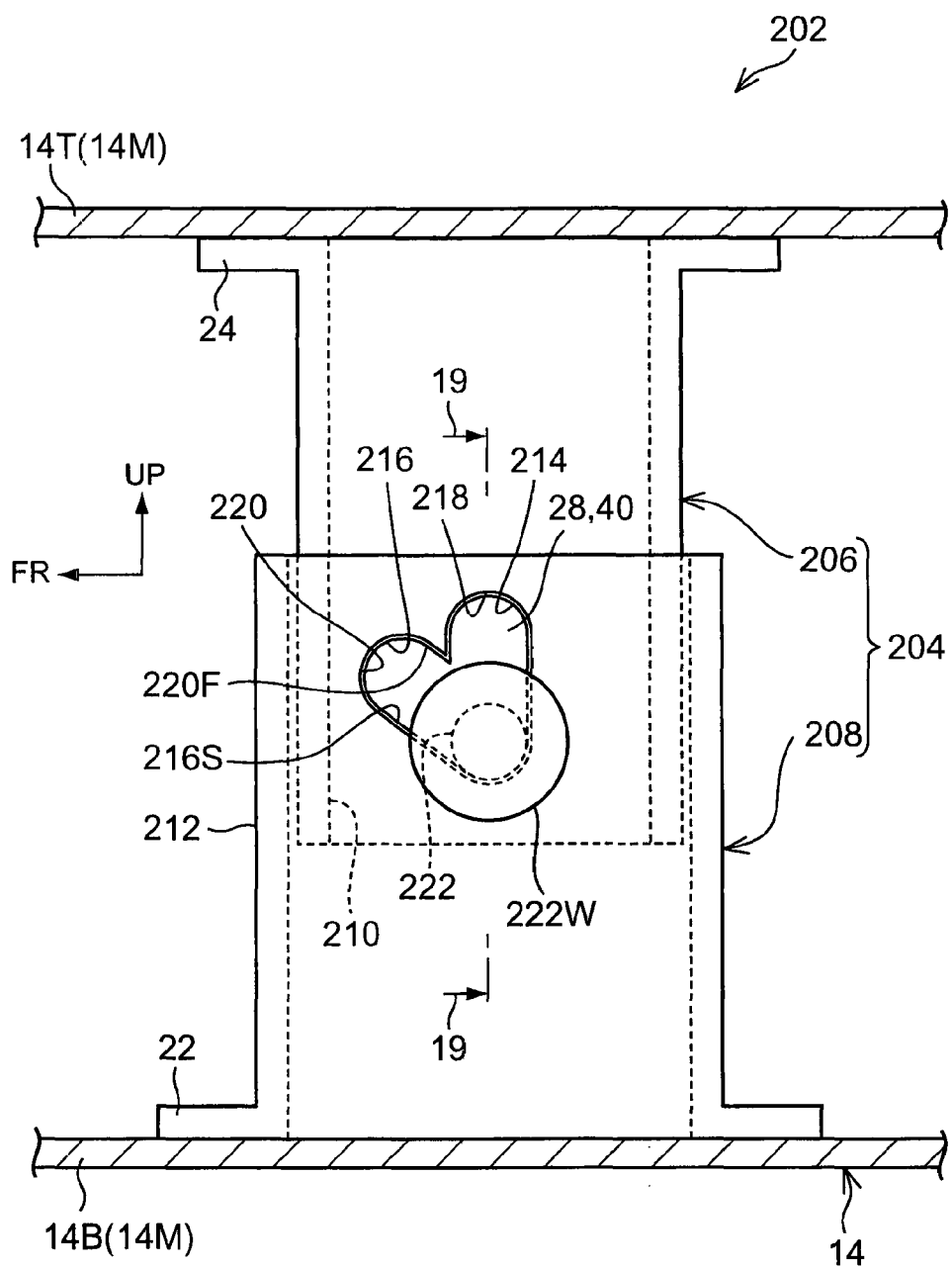
FIG. 18A is an enlarged sectional view partially illustrating the fuel tank according to the eighth embodiment of the present invention in a state where the fuel tank is not deformed.
Figure 18B:
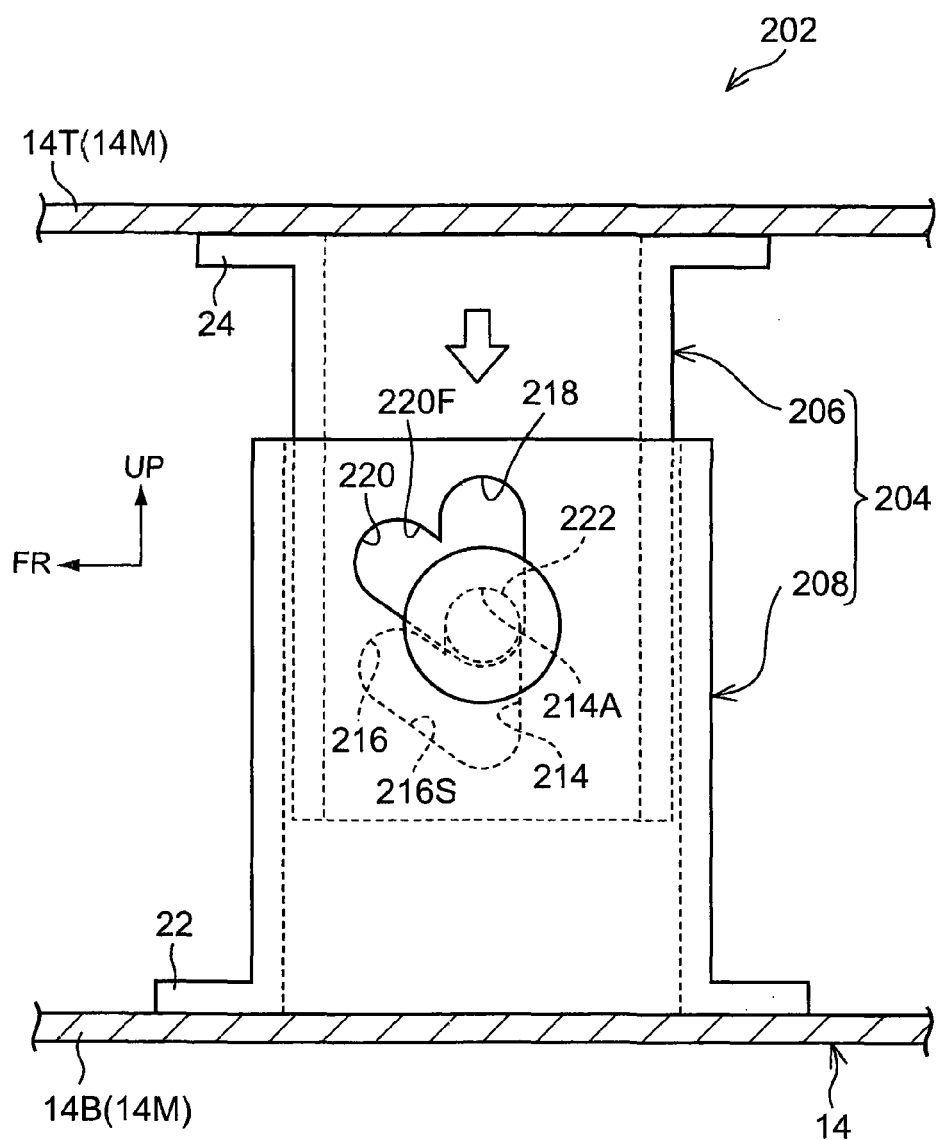
FIG. 18B is an enlarged sectional view partially illustrating the fuel tank according to the eighth embodiment of the present invention in a state where the fuel tank is compressively deformed.
Figure 18C:
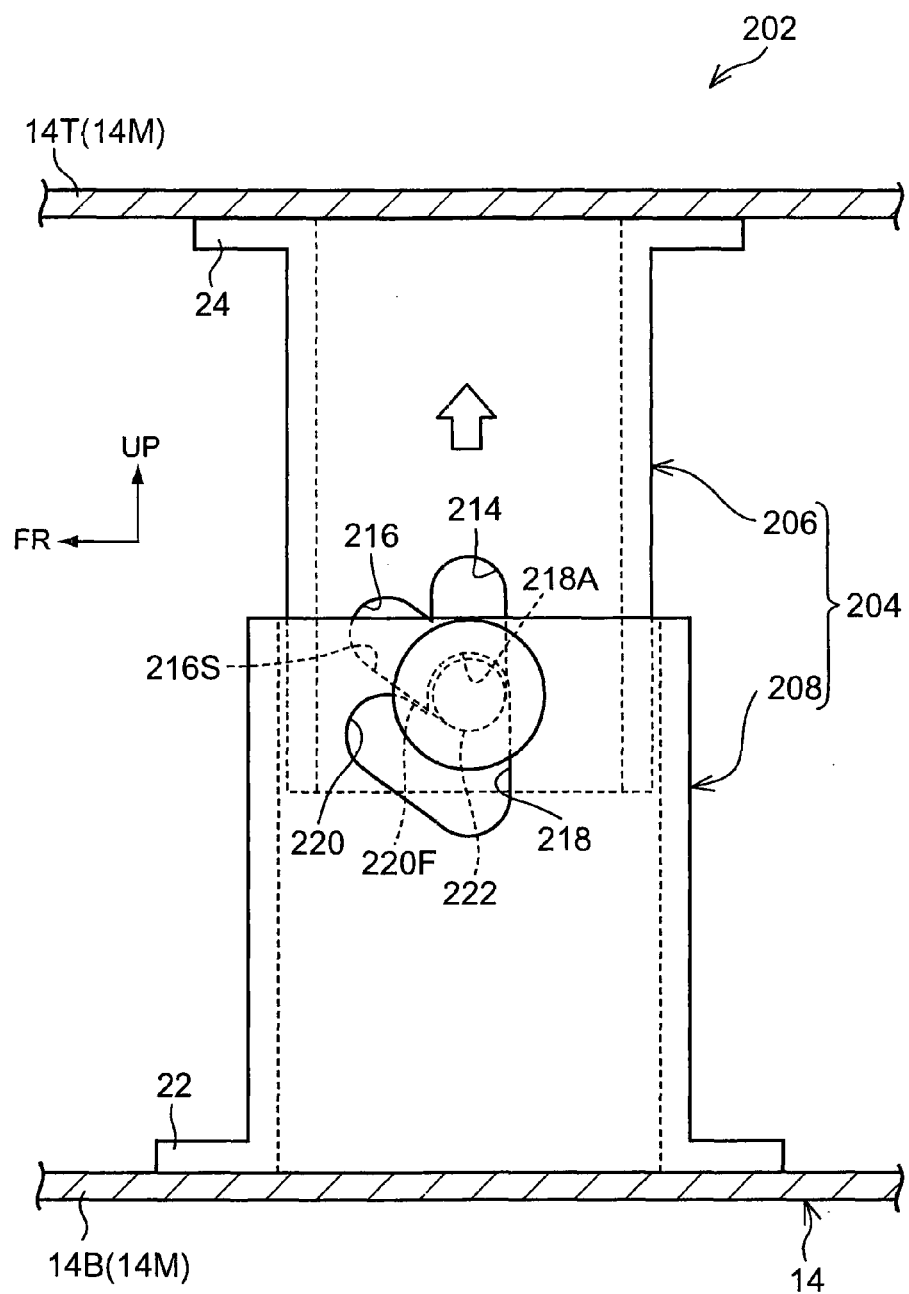
FIG. 18C is an enlarged sectional view partially illustrating the fuel tank according to the eighth embodiment of the present invention in a state where the fuel tank is deformed in an expanding manner.
Figure 18D:
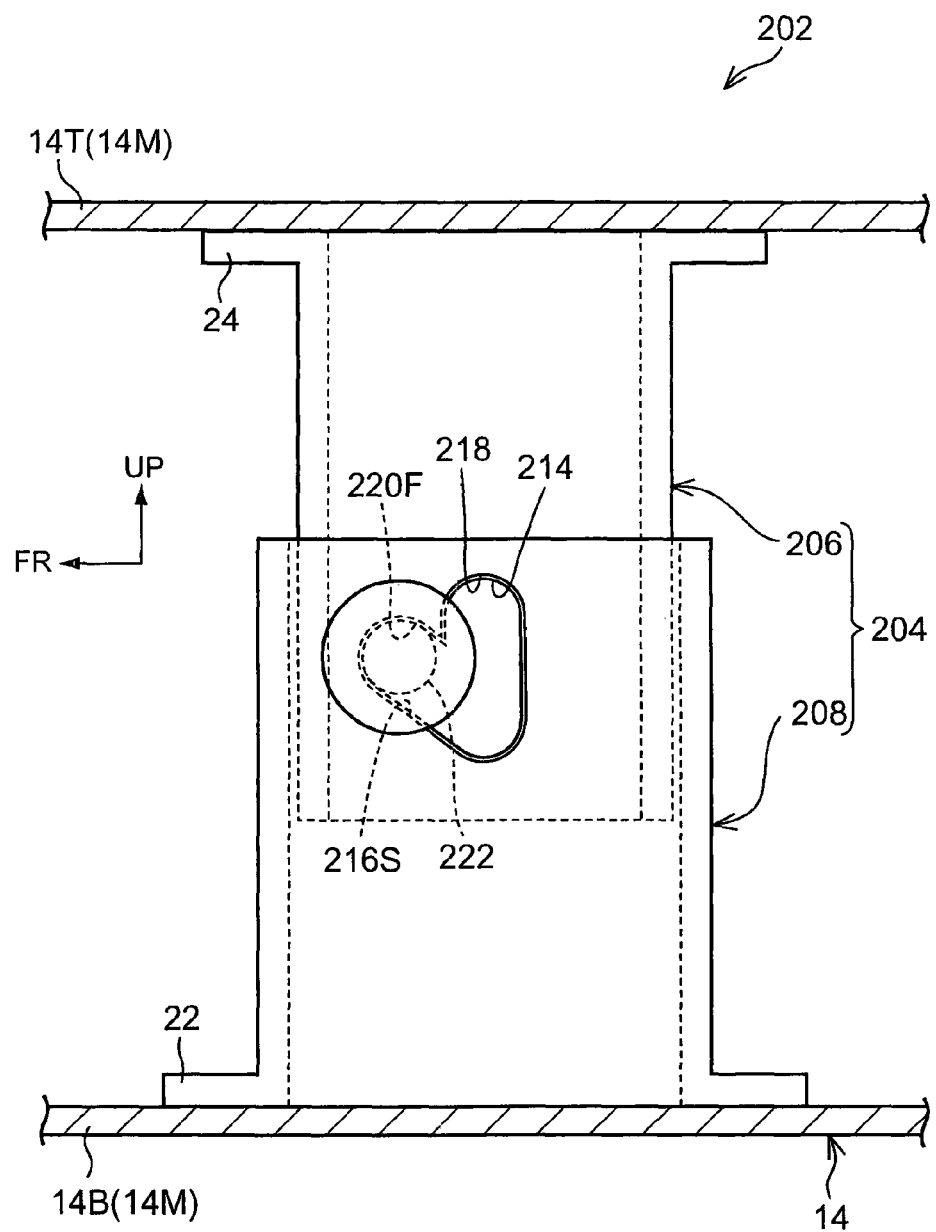
FIG. 18D is an enlarged sectional view partially illustrating the fuel tank according to the eighth embodiment of the present invention in a state where acceleration is applied to the fuel tank.

In the fuel tank 162 of the seventh embodiment configured as such, when a tank internal pressure of the fuel-tank main body 14 becomes a negative pressure in a state where the moving ball 172 is placed in the recessed portion 170H, the first gap 28 is narrowed gradually, so that the top wall 14T and the bottom wall 14B of the fuel-tank main body 14 are allowed to curve in a direction where the top wall 14T and the bottom wall 14B come close to each other. Then, as illustrated in FIG. 16B, when the first gap 28 between the bottom end 166B of the upper-side tubular member 166 and the bottom wall 14B of the fuel-tank main body 14 is eliminated and the bottom end 166B comes in contact with the bottom wall 14B, the top wall 14T and the bottom wall 14B of the fuel-tank main body 14 are prevented from curving.

In the seventh embodiment, when the tank internal pressure of the fuel-tank main body 14 becomes a positive pressure in a state where the moving ball 172 is placed in the recessed portion 170H, the second gap 40 is narrowed gradually, so that the top wall 14T and the bottom wall 14B of the fuel-tank main body 14 are allowed to curve in a direction where the top wall 14T and the bottom wall 14B separate from each other. As illustrated in FIG. 16C, when the second gap 40 between the inclined surface 170S and the opposed surface 176F is eliminated and the inclined surface 170S comes in contact with the opposed surface 176F, the top wall 14T and the bottom wall 14B of the fuel-tank main body 14 are prevented from curving.

That is, even in the fuel tank 162 of the seventh embodiment, a compressive deformation of the fuel-tank main body 14 is allowed at the time of the negative pressure of the fuel-tank main body 14, and its deformation amount is restricted to a given amount at which the first gap 28 is eliminated. Further, an expansion deformation of the fuel-tank main body 14 is allowed at the time of the positive pressure of the fuel-tank main body 14, and its deformation amount is restricted to a given amount at which the second gap 40 is eliminated.

Further, in the fuel tank 162 of the seventh embodiment, when horizontal acceleration is applied to the fuel-tank main body 14 and the moving ball 172 moves upward on the inclined surface 170S, the moving ball 172 enters the second gap 40. Thus, when the moving ball 172 enters the second gap 40, the separation between the lower-side tubular member 168 and the upper-side tubular member 166 in the up-down direction in the figure is restrained, so that deformations of the top wall 14T and the bottom wall 14B of the fuel-tank main body 14 in a separation direction are also restrained.

In the seventh embodiment, the inclined surface 170S may be formed only in a specific direction from the recessed portion 170H, e.g., only on the vehicle front side and the vehicle rear side of the recessed portion 170H. In a case of the shape in which the inclined surface 170S is inclined upward from the recessed portion 170H entirely in a radially outward circumference in a circumferential direction as described above, if acceleration to be applied to the fuel tank 162 is horizontal acceleration, the moving ball 172 can be moved to the second gap 40 without depending on the direction.

The moving member is not limited to the moving ball 172 described above, but the moving ball 172 rolls over the inclined surface 170S to move upward. That is, friction between the moving member and the inclined surface 170S is small. In view of this, a threshold value of the acceleration for the moving member to move upward on the inclined surface 170S is easily controllable by an inclination angle of the inclined surface 17S.

Next will be described an eighth embodiment of the present invention.

Figure 19:
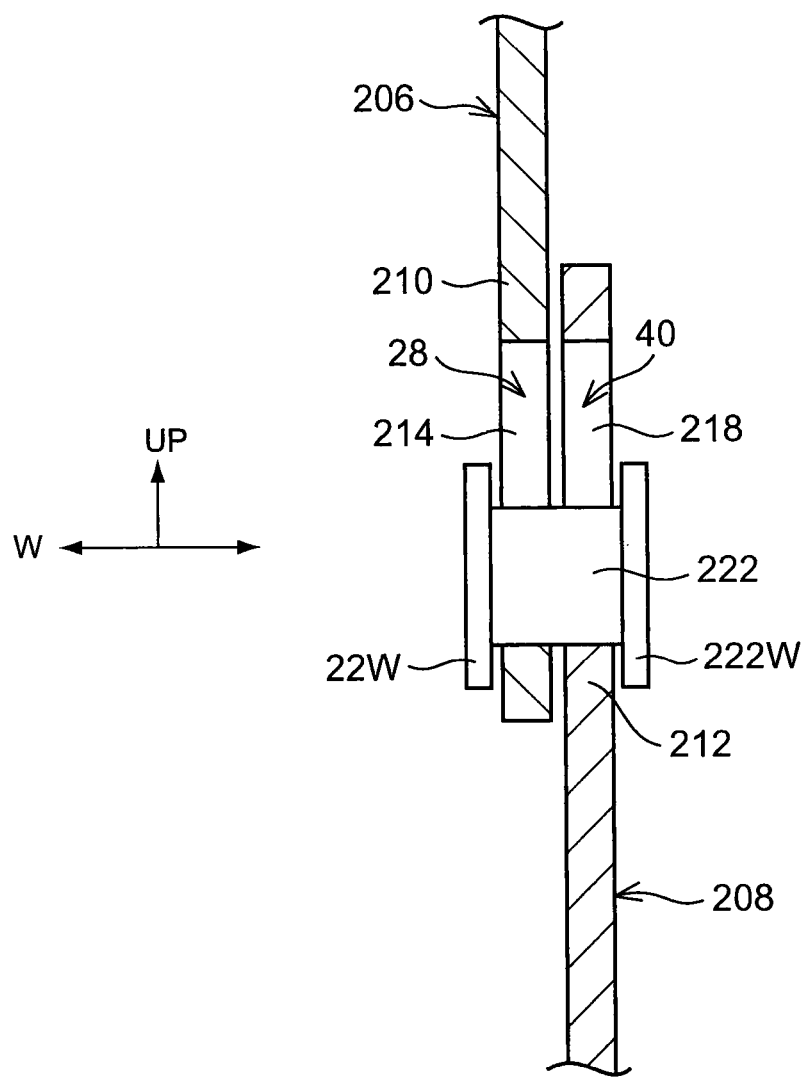
FIG. 19 is a sectional view taken along a line 19-19 in FIG. 18A that partially illustrates the fuel tank according to the eighth embodiment of the present invention in a state where the fuel tank is not deformed.

FIGS. 17 to 19 partially illustrate a fuel tank 202 of the eighth embodiment in an enlarged manner. In the eighth embodiment, the same constituent, member, or the like has the same reference sign as in the first embodiment, and a detailed description thereof is omitted. In the eighth embodiment, a position of a structural member can be placed in the same position as in the fuel tank 132 (see FIG. 12) of the sixth embodiment.

A structural member 204 of the eighth embodiment includes an upper-side tubular member 206 and a lower-side tubular member 208. The upper-side tubular member 206 is attached to a top wall 14T of a fuel-tank main body 14 via a mounting flange 24. The upper-side tubular member 206 is extended toward a bottom wall 14B.

The lower-side tubular member 208 is attached to the bottom wall 14B of the fuel-tank main body 14 via a mounting flange 22. The lower-side tubular member 208 is extended toward the top wall 14T.

In the present embodiment, the upper-side tubular member 206 and the lower-side tubular member 208 may be formed in a cylindrical shape or in a squarely cylindrical shape.

The lower-side tubular member 208 has a diameter larger than that of the upper-side tubular member 206, and is placed outside the upper-side tubular member 206. However, the lower-side tubular member 208 may have a shape in which the lower-side tubular member 208 is placed inside the upper-side tubular member 206. The upper-side tubular member 206 and the lower-side tubular member 208 include overlap portions 210, 212 that overlap with each other in a horizontal direction (a direction perpendicular to a direction where opposing walls 14M are opposed to each other).

A moving hole 214 is formed in the overlap portion 210 of the upper-side tubular member 206 such that its longitudinal direction is along an opposed direction (the up-down direction) of the opposing walls 14M. An inclination hole 216 that is inclined upward toward the vehicle front side is provided continuously from a lower part of the moving hole 214. A bottom face of the inclination hole 216 is an inclined surface 216S.

On the other hand, a moving hole 218 is formed in the overlap portion 212 of the lower-side tubular member 208 such that its longitudinal direction is along the opposed direction of the opposing walls 14M. An opposed hole 220 that is inclined upward toward the vehicle front side is provided continuously from a lower part of the moving hole 218. A top face of the opposed hole 220 is an opposed surface 220F.

In a state where the fuel-tank main body 14 is not deformed, the moving hole 214 and the moving hole 218 are placed generally in the same position and have generally the same shape when viewed in the vehicle width direction, and the inclination hole 216 and the opposed hole 220 are placed generally in the same position and have generally the same shape, as can be seen from FIGS. 17 and 19.

A moving pin 222 as a moving member is inserted into the moving hole 214 and the moving hole 218. A diameter of the moving pin 222 is slightly smaller than a hole width W1 of the moving holes 214, 218, the inclination hole 216, and the opposed hole 220. A large-diameter portion 222W that is larger than the hole width W1 is formed in an axial end of the moving pin 222, so as to prevent the moving pin 222 from falling off from the moving holes 214, 218, the inclination hole 216, and the opposed hole 220.

The moving pin 222 is placed in a lower part of the inclined surface 216S. A first gap 28 is formed between the moving pin 222 and a top face 214A of the moving hole 214. A second gap 40 is formed between the moving pin 222 and a top face 218A of the moving hole 218.

In the fuel tank 202 of the eighth embodiment configured as such, when a tank internal pressure of the fuel-tank main body 14 becomes a negative pressure in a state where the moving pin 222 is placed in the lower parts of the moving holes 214, 218, the first gap 28 is narrowed gradually, so that the top wall 14T and the bottom wall 14B of the fuel-tank main body 14 are allowed to curve in a direction where the top wall 14T and the bottom wall 14B come close to each other. When the first gap 28 between the moving pin 222 and the top face 214A of the moving hole 214 is eliminated and the moving pin 222 comes in contact with the top face 214A, the top wall 14T and the bottom wall 14B of the fuel-tank main body 14 are prevented from curving.

In the fuel tank 202 of the eighth embodiment, when the tank internal pressure of the fuel-tank main body 14 becomes a positive pressure in a state where the moving pin 222 is placed in the lower parts of the moving holes 214, 218, the second gap 40 is narrowed gradually, so that the top wall 14T and the bottom wall 14B of the fuel-tank main body 14 are allowed to curve in a direction where the top wall 14T and the bottom wall 14B separate from each other. When the second gap 40 between the moving pin 222 and the top face 218A of the moving hole 218 is eliminated and the moving pin 222 comes in contact with the top face 218A, the top wall 14T and the bottom wall 14B of the fuel-tank main body 14 are prevented from curving.

That is, even in the fuel tank 202 of the eighth embodiment, a compressive deformation of the fuel-tank main body 14 is allowed at the time of the negative pressure of the fuel-tank main body 14, and its deformation amount is restricted to a given amount at which the first gap 28 is eliminated. Further, an expansion deformation of the fuel-tank main body 14 is allowed at the time of the positive pressure of the fuel-tank main body 14, and its deformation amount is restricted to a given amount at which the second gap 40 is eliminated.

Further, in the fuel tank 202 of the eighth embodiment, when acceleration toward the vehicle front side is applied to the fuel-tank main body 14 and the moving pin 222 moves upward on the inclined surface 216S, the moving pin 222 is substantially sandwiched between the inclination hole 216 and the opposed hole 220 in the up-down direction. Thus, the lower-side tubular member 208 and the upper-side tubular member 206 are restrained from moving relative to each other in the up-down direction, so that deformations of the top wall 14T and the bottom wall 14B of the fuel-tank main body 14 in a separation direction are also restrained.

Figure 20:
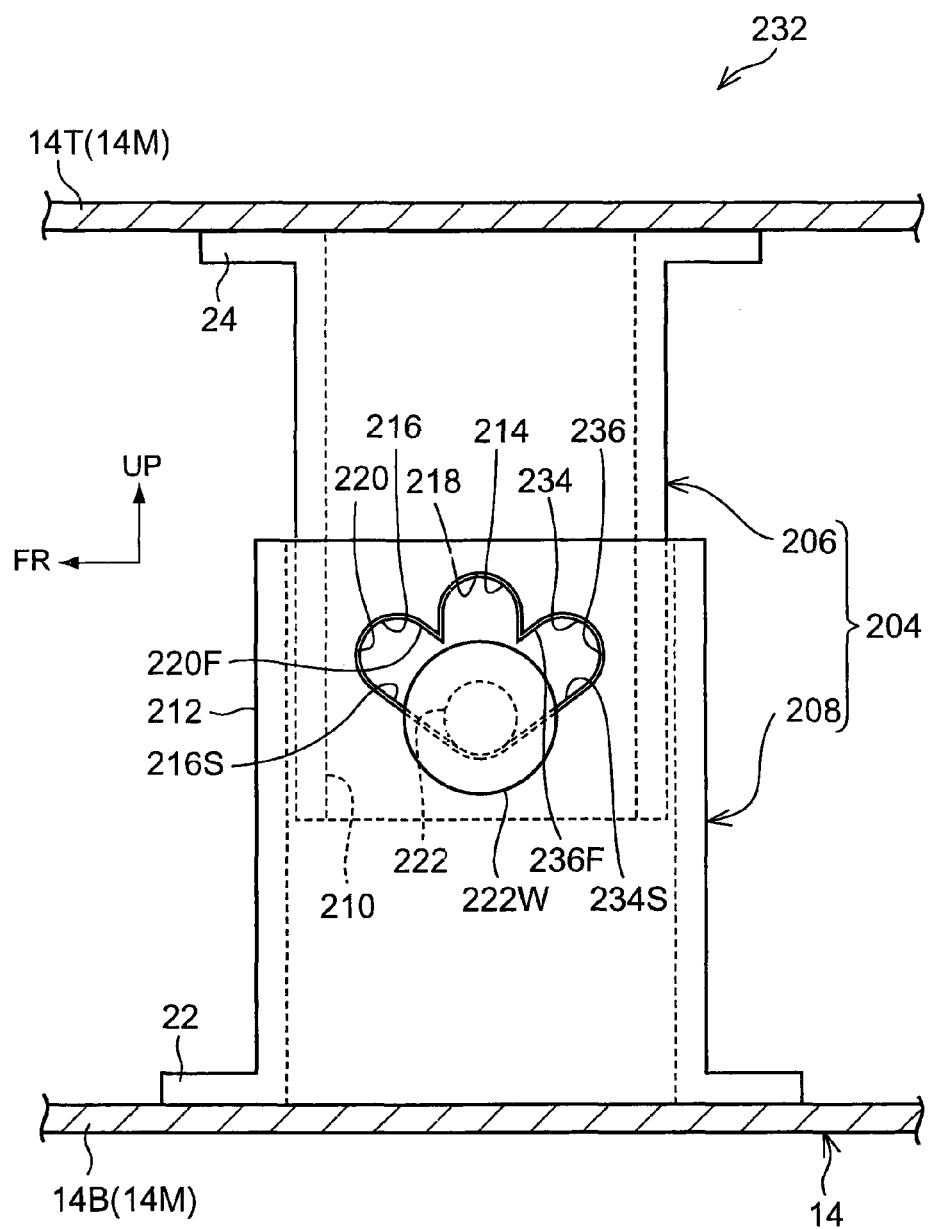
FIG. 20 is an enlarged sectional view partially illustrating a fuel tank according to a modification of the eighth embodiment of the present invention in a state where the fuel tank is not deformed.

FIG. 20 partially illustrates a fuel tank 232 according to a modification of the eighth embodiment of the present invention in an enlarged manner. In the modification of the eighth embodiment, the same constituent, member, or the like in the eighth embodiment has the same reference sign as in the eighth embodiment, and a detailed description thereof is omitted.

In the modification of the eighth embodiment, an inclination hole 234 that is inclined upward toward the vehicle rear side is provided continuously from the lower part of the moving hole 214. A bottom face of the inclination hole 234 is an inclined surface 234S.

Further, an opposed hole 236 that is inclined upward toward the vehicle front side is provided continuously from the lower part of the moving hole 218. A top face of the opposed hole 236 is an opposed surface 236F.

In a state where the fuel-tank main body 14 is not deformed, the inclination hole 234 and the opposed hole 236 are placed generally in the same position and have generally the same shape when viewed in the vehicle width direction.

Accordingly, in addition to the effect of the eighth embodiment, the modification of the eighth embodiment yields the following effect that: even when acceleration toward the vehicle rear side is applied and the moving pin 222 moves upward on the inclined surface 234S of the inclination hole 234, the lower-side tubular member 208 and the upper-side tubular member 206 are restrained from moving relative to each other in the up-down direction, so that deformations of the top wall 14T and the bottom wall 14B of the fuel-tank main body 14 in a separation direction are also restrained.

Note that, in the eighth embodiment and its modification, the moving ball 172 of the seventh embodiment can be used as the moving member instead of the moving pin 222. In a structure using the moving ball 172, a member, e.g., a guide wall, for preventing the moving ball 172 from falling off from the moving holes 214, 218, the inclination holes 216, 234, and the opposed holes 220, 236 may be provided.

Each of the above embodiments deals with an example in which the "first extension member" and the "second extension member" of the present invention correspond to either of the "lower-side reinforcing member 18" and the "upper-side reinforcing member." However, these extension members do not have to be members for reinforcing the fuel-tank main body 14.

The first to sixth embodiments deal with an example in which the top wall 14T and the bottom wall 14B of the fuel-tank main body 14 are provided in the horizontal direction. However, the top wall 14T and the bottom wall 14B may be provided in a vertical direction (or in a diagonal direction).

The invention claimed is:

1. A fuel tank comprising:
a fuel-tank main body in which to store fuel; and
a structural member provided between two opposing walls of the fuel-tank main body, the structural member including a first contacting member configured to eliminate a first gap so as to achieve contact when the opposing walls come close to each other, the structural member including a second contacting member configured to eliminate a second gap so as to achieve contact when the opposing walls separate from each other,
the structural member includes
a first extension member extended from one of the opposing walls toward the other one of the opposing walls,
a second extension member extended from the other one of the opposing walls toward the one of the opposing walls,
a first fitting hole formed in the first extension member so that the opposed member is fitted to the first fitting hole,
a second fitting hole formed in the second extension member so that the opposed member is fitted to the second fitting hole,
a first slit formed in the first extension member in communication with the first fitting hole so that the first slit is opened outside the first extension member, and
a second slit formed in the second extension member in communication with the second fitting hole so that the second slit is opened outside the second extension member, the first slit and the second slit are open in the same direction,
the second contacting member includes
a second contacting portion provided in the first extension member, and
a second contacted portion provided in that one of the opposing walls which is opposed to the first extension member or the second extension member, the second contacted portion forming the second gap between the second contacted portion and the second contacting portion, and
the second contacted portion is provided in an opposed member provided in that one of the opposing walls which is opposed to the first extension member or the second extension member, the opposed member being opposed to the second contacting portion.

2. The fuel tank according to claim 1, wherein:
the first contacting member includes
a first contacting portion provided in the first extension member, and
a first contacted portion provided in that one of the opposing walls which is opposed to the first extension member or the second extension member, the first contacted portion forming the first gap between the first contacted portion and the first contacting portion.

3. The fuel tank according to claim 1, wherein:
the opposed member is fixed to that one of the opposing walls which is opposed to the first extension member or the second extension member.

4. The fuel tank according to claim 1, wherein:
the structural member includes
a first engaging portion formed in the first extension member,
a second engaging portion formed in the second extension member, and
an engaged member to be engaged with the first engaging portion and the second engaging portion when the fuel moves in the fuel-tank main body.

5. A fuel tank comprising:
a fuel-tank main body in which to store fuel; and
a structural member provided between two opposing walls of the fuel-tank main body, the structural member including a first contacting member configured to eliminate a first gap so as to achieve contact when the opposing walls come close to each other, the structural member including a second contacting member configured to eliminate a second gap so as to achieve contact when the opposing walls separate from each other, wherein
the structural member includes
a first extension member extended from one of the opposing walls toward the other one of the opposing walls,
a second extension member extended from the other one of the opposing walls toward the one of the opposing walls,
a first engaging portion formed in the first extension member,
a second engaging portion formed in the second extension member, and
an engaged member to be engaged with the first engaging portion and the second engaging portion when the fuel moves in the fuel-tank main body,
the second contacting member includes
a second contacting portion provided in the first extension member, and
a second contacted portion provided in that one of the opposing walls which is opposed to the first extension member or the second extension member, the second contacted portion forming the second gap between the second contacted portion and the second contacting portion, the second contacted portion is provided in an opposed member provided in that one of the opposing walls which is opposed to the first extension member or the second extension member, the opposed member being opposed to the second contacting portion, and the opposed member is fitted to the first extension member and the second extension member, the first extension member and the second extension member include overlap portions that overlap with each other when viewed in a direction perpendicular to an extending direction of the first extension member and the second extension member;

the structural member includes
- a first through hole serving as the first engaging portion formed in the overlap portion of the first extension member,
- a second through hole serving as the second engaging portion formed in the overlap portion of the second extension member,
- an opposed member opposed to the overlapping portions and configured to come close to the overlap portions when the fuel moves in the fuel tank, and
- an insertion member provided in the opposed member and serving as the engaged member configured to be inserted into the first through hole and the second through hole when the opposed member comes close to the overlap portions in a state where the first through hole and the second through hole align with each other.

6. The fuel tank according to claim 5, wherein:
the first extension member is a first tubular member having a tubular shape and extending in a direction in which two opposing walls of the fuel-tank main body oppose, and
the second extension member is a second tubular member placed outside the first tubular member or inside the first tubular member.

7. The fuel tank according to claim 6, wherein:
the structural member is configured such that a plurality of the first through holes is formed in a circumferential direction of the first tubular member and a plurality of the second through holes is formed in a circumferential direction of the second tubular member, and a plurality of opposed members each including the insertion member is provided around the first tubular member and the second tubular member in the circumferential direction.

8. The fuel tank according to claim 5, wherein:
the structural member includes a spring member configured to bias the opposed member in a direction where the opposed member separates from the overlap portions, so as to maintain a state where the insertion member is not inserted into the first through hole and the second through hole at the time when flow of the fuel is not more than a predetermined amount.

9. A fuel tank comprising:
a fuel-tank main body in which to store fuel; and
a structural member provided between two opposing walls of the fuel-tank main body, the structural member including a first contacting member configured to eliminate a first gap so as to achieve contact when the opposing walls come close to each other, the structural member including a second contacting member configured to eliminate a second gap so as to achieve contact when the opposing walls separate from each other, wherein the structural member includes
- a first extension member extended from one of the opposing walls toward the other one of the opposing walls,
- a second extension member extended from the other one of the opposing walls toward the one of the opposing walls,
- an inclined surface provided in the first extension member so as to be inclined with respect to a horizontal direction,
- a moving member supported by the inclined surface so as to move upward on the inclined surface when receiving lateral acceleration in side view, the moving member being a ball, and
- an opposed surface provided in the second extension member and configured to face the moving member from above when the moving member moves upward on the inclined surface in side view, the second contacting member includes
- a second contacting portion provided in the first extension member, and
- a second contacted portion provided in that one of the opposing walls which is opposed to the first extension member or the second extension member, the second contacted portion forming the second gap between the second contacted portion and the second contacting portion,
the second contacted portion is provided in an opposed member provided in that one of the opposing walls which is opposed to the first extension member or the second extension member, the opposed member being opposed to the second contacting portion, and
the opposed member is fitted to the first extension member and the second extension member.

10. The fuel tank according to claim 9, wherein:
the first extension member is an upper extension member extended from a top wall of the fuel-tank main body toward a bottom wall of the fuel-tank main;
the second extension member is a lower extension member extended from the bottom wall of the fuel-tank main body toward the top wall of the fuel-tank main;
the inclined surface is provided in the upper extension member; and
the opposed surface is provided in the lower extension member.

11. The fuel tank according to claim 10, wherein:
the lower extension member and the upper extension member include overlap portions that overlap with each other when viewed in a horizontal direction; and
the structural member includes
- an inclination hole penetrating through the overlap portion of the upper extension member and constituting the inclined surface so as to support the moving member,
- an opposed hole penetrating through the overlap portion of the lower extension member and constituting the opposed surface so that the moving member is inserted in the opposed hole, and
- a moving hole formed continuously from at least one of the inclination hole and the opposed hole and the moving hole configured such that the moving member moves in the moving hole at the time when the upper extension member and the lower extension member move upward and downward relative to each other in side view.

12. The fuel tank according to claim 8, wherein:
the inclined surface is inclined upward from a center part placed in a relatively low position toward outside in a whole circumference in side view.

13. The fuel tank according to claim 9, wherein:
a gap between the inclined surface and the opposed surface constitutes the second gap.

* * * * *